US012326777B2

United States Patent
Pole et al.

(10) Patent No.: US 12,326,777 B2
(45) Date of Patent: Jun. 10, 2025

(54) METHOD AND SYSTEM FOR REAL-TIME IDENTIFICATION OF ROOT CAUSE OF A FAULT IN A GLOBALLY DISTRIBUTED VIRTUAL DESKTOP FABRIC

(71) Applicant: Workspot, Inc., San Jose, CA (US)

(72) Inventors: Anushree Kunal Pole, San Jose, CA (US); Amitabh Bhuvangyan Sinha, San Jose, CA (US); David T. Sulcer, San Jose, CA (US); Edward A. Seidman, San Jose, CA (US); Lisa Wing San Chui, San Jose, CA (US); Virabrahma Prasad Krothapalli, San Jose, CA (US); Jimmy Chang, San Jose, CA (US); Shiva Prasad Madishetti, San Jose, CA (US)

(73) Assignee: WORKSPOT, INC., Campbell, CA (US)

( * ) Notice: Subject to any disclaimer, the term of this patent is extended or adjusted under 35 U.S.C. 154(b) by 235 days.

(21) Appl. No.: 17/233,127

(22) Filed: Apr. 16, 2021

(65) Prior Publication Data

US 2022/0334903 A1  Oct. 20, 2022

(51) Int. Cl.
*G06F 11/00* (2006.01)
*G06F 9/455* (2018.01)
(Continued)

(52) U.S. Cl.
CPC ........ *G06F 11/079* (2013.01); *G06F 9/45558* (2013.01); *G06F 11/0709* (2013.01);
(Continued)

(58) Field of Classification Search
CPC ............... G06F 11/079; G06F 11/0709; G06F 11/0712; G06F 11/0751; G06F 11/1484;
(Continued)

(56) References Cited

U.S. PATENT DOCUMENTS 10,693,711 B1 * 6/2020 Garg ..................... H04L 41/12
2022/0327012 A1 * 10/2022 Roy ..................... G06K 9/6253

FOREIGN PATENT DOCUMENTS

EP           3355195 A1 *  8/2018  .......... G06F 11/0781

OTHER PUBLICATIONS

Logentries, Identify and Resolve Performance Problems Before They Impact End Users, Jan. 19, 2015, https://logentries.com/insights/troubleshooting-diagnostics/, 4 pages (Year: 2015).*

(Continued)

*Primary Examiner* — Katherine Lin
(74) *Attorney, Agent, or Firm* — NIXON PEABODY LLP

(57) ABSTRACT

A system and method for determining root causes of a failure in a virtual desktop system in real time is disclosed. The virtual remote desktop system has interconnected service components to make a virtual desktop available on a client device, and agents monitoring events from the components. An event collection module is coupled to the agents of the desktop system. The event collection module compiles events from the components relating to the failure. An aggregation module is coupled the event collection module. The aggregation module correlates events in a time-ordered stream relating to the fault. A diagnosis analysis system identifies one of the events of the time-ordered stream as the likely root cause of the fault.

28 Claims, 12 Drawing Sheets

(51) Int. Cl.
*G06F 11/07* (2006.01)
*G06F 16/2455* (2019.01)

(52) U.S. Cl.
CPC ...... *G06F 11/0712* (2013.01); *G06F 11/0751* (2013.01); *G06F 16/24558* (2019.01); *G06F 2009/45591* (2013.01)

(58) Field of Classification Search
CPC .............. G06F 11/301; G06F 11/3466; G06F 11/3495; G06F 11/3476; G06F 11/323; G06F 11/324; G06F 11/326; G06F 11/328
See application file for complete search history.

(56) References Cited

OTHER PUBLICATIONS

Fighel, Get ready for next-gen AIOps to detect, understand, and resolve problems faster than ever, Mar. 17, 2021, https://newrelic.com/blog/how-to-relic/aiops-applied-intelligence, 27 pages (Year: 2021).*

* cited by examiner

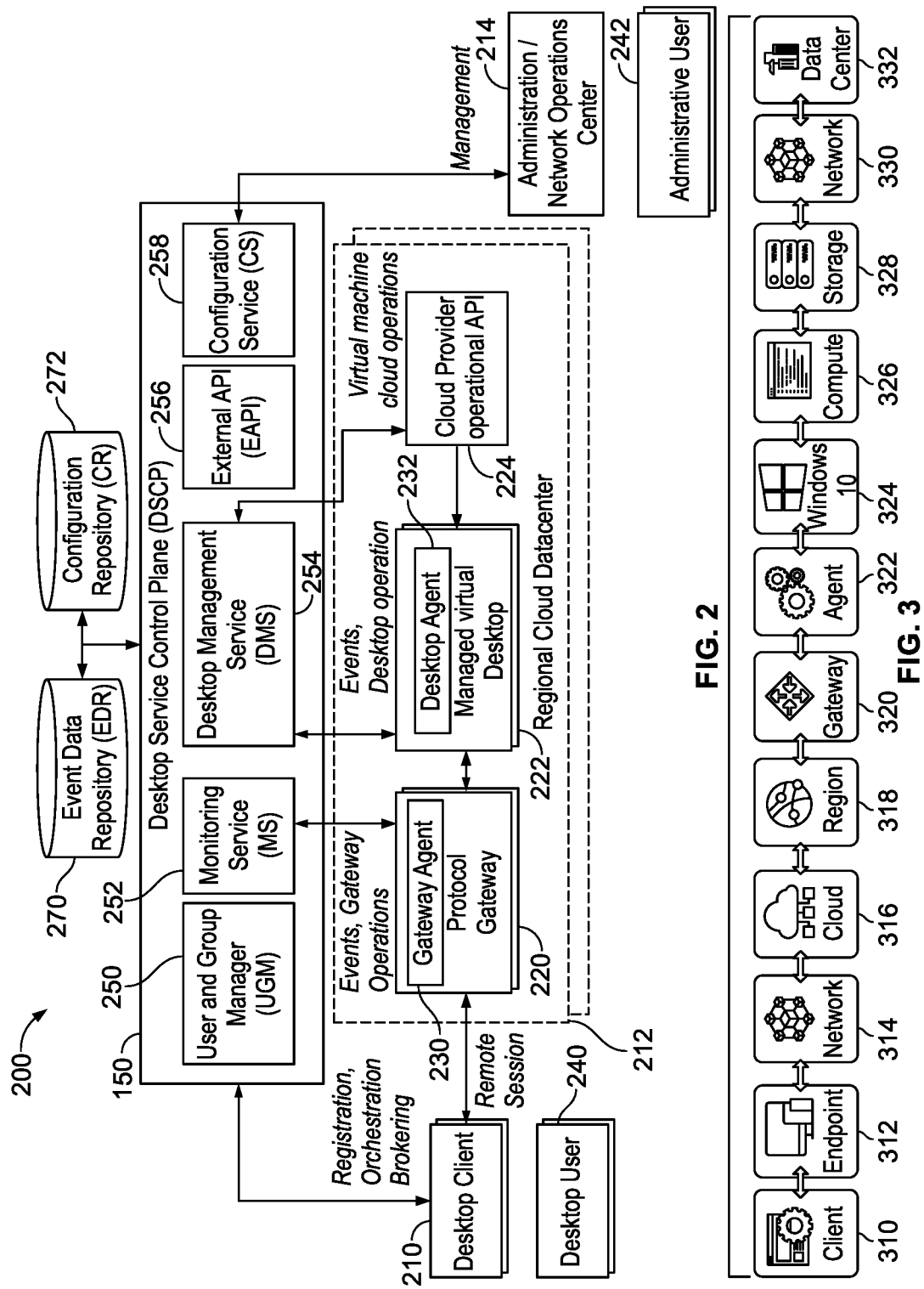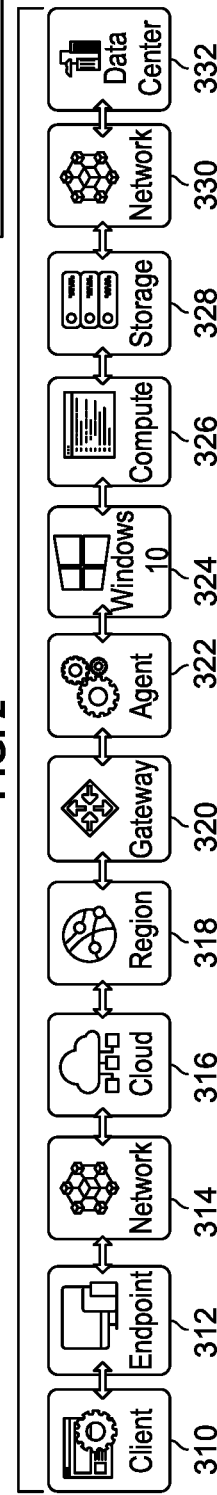

400 ⤴

| From Component | Request | To Component |
|---|---|---|
| Control plane | Provision new RDP Gateway | Cloud provider |
| RDP Gateway Agent | Register | Control plane |
| Control plane | Provision new virtual desktop | Cloud provider |
| Virtual Desktop Agent | Register | Control plane |
| Control plane | Allocate virtual desktop to user | n/a |
| Control plane | Connection configuration | Client |
| Client | Connection Attempt | Gateway |
| Gateway | Connection Attempt | Virtual Desktop |
| Client | Report successful connection | Control plane |
| Control plane | Admin policy change | Virtual Desktop |

FIG. 4

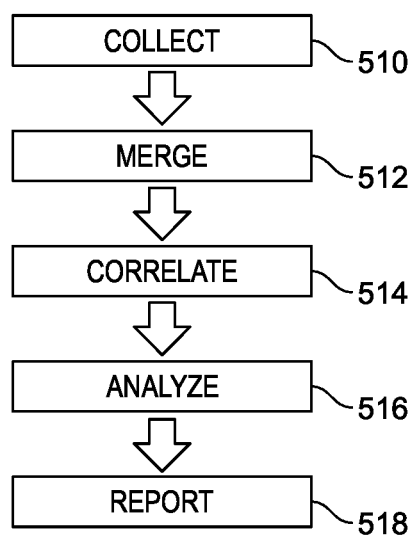

FIG. 5

Correlated Event Stream — 760

- UserID = joe@acme.com
  DesktopID = pool-usw-004
  Time = T1 (UTC)
  Event ID = 7a1b948d-bea8-477
  Source = Client:123
  Type = Attempt Connection
  Msg = Attempt Connection
  Client IP = 123.2.123.3
  Target = 38.123.21.23
  User = joe@acme.com  — 720, 770

- UserID = joe@acme.com
  DesktopID = pool-usw-004
  Time = T2 (UTC)
  Event ID = 9847a0f0-4b32
  Source = Agent:456
  Type = Session Start
  Desc = Session Init
  Registration Key = 456
  Client IP = 123.2.123.3  — 740

- UserID = joe@acme.com
  DesktopID = pool-usw-004
  Time = T3 (UTC)
  Event ID = 2b321ad7-34fa
  Source = Client:123
  Type = Connection Success
  Msg = Connection Success
  Target = 38.123.21.23
  Code = 200  — 722

- UserID = joe@acme.com
  DesktopID = pool-usw-004
  Time = T4 (UTC)
  Event ID = b4d8319e-3827
  Source = Agent:456
  Type = Session Start
  Desc = Session Start
  Registration Key = 456
  Session Id = 2345  — 742

- UserID = joe@acme.com
  DesktopID = pool-usw-004
  Time = T5 (UTC)
  Event ID = 8968772-f1de
  Source = Admin
  Type = Update Image Command
  Registration Key = 456
  Command = Update Image
  Admin = bill@acme.com
  Template = Win10t
  Schedule = immediate  — 730

- UserID = joe@acme.com
  DesktopID = pool-usw-004
  Time = T6 (UTC)
  Event ID = 9075013a-164
  Source = Agent:456
  Type = Session Fail
  Desc = Session Fail
  Registration Key = 456
  Session Id = 2345
  Reason = Process Fail  — 744

FIG. 7C

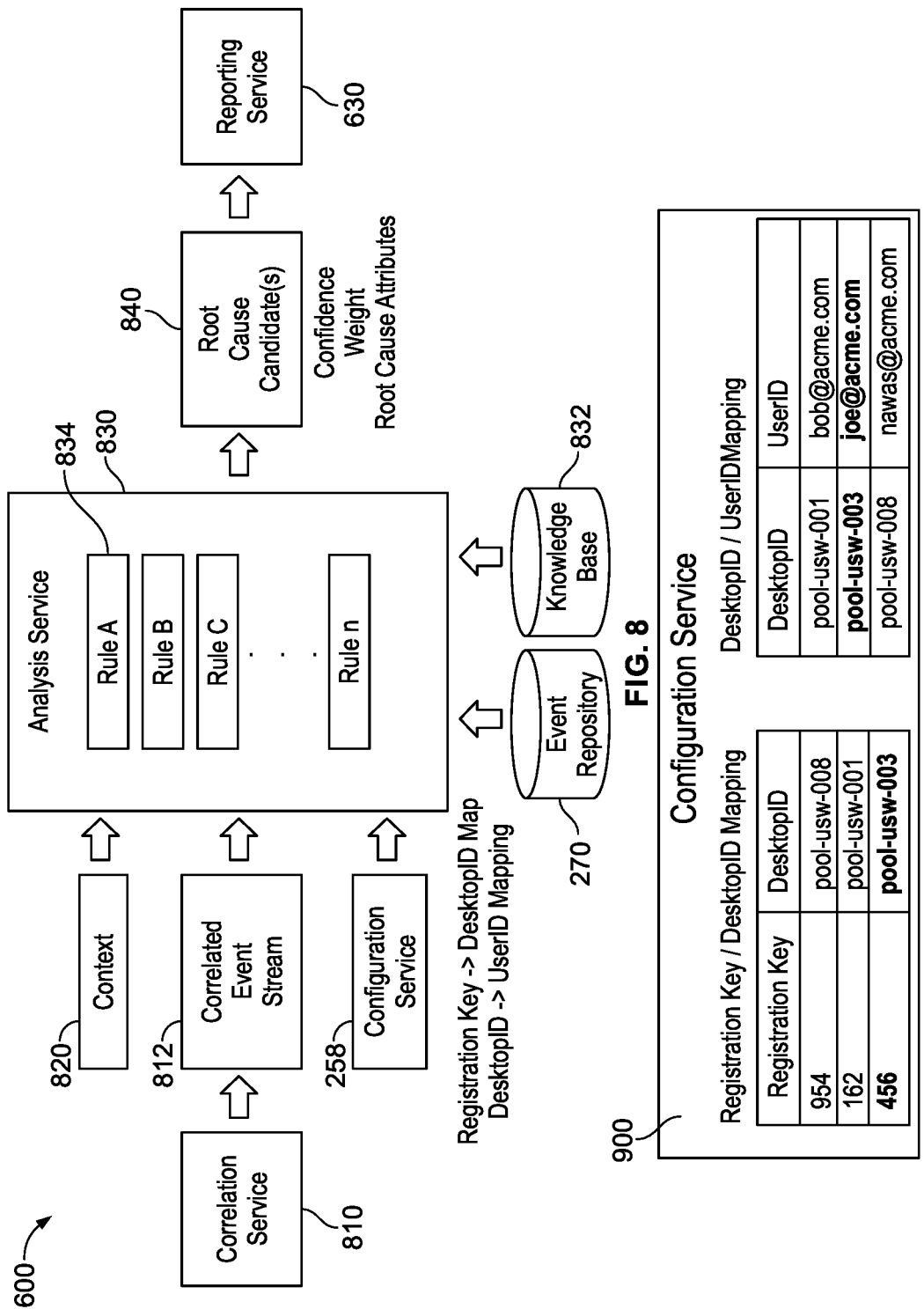

METHOD AND SYSTEM FOR REAL-TIME IDENTIFICATION OF ROOT CAUSE OF A FAULT IN A GLOBALLY DISTRIBUTED VIRTUAL DESKTOP FABRIC

TECHNICAL FIELD

The present disclosure relates generally to network-based systems. More particularly, aspects of this disclosure relate to a global fabric that allows provision of a virtual desktop to users in different regions from a global fabric, and monitoring capabilities to detect the root cause of faults within the fabric.

BACKGROUND

Computing systems that rely on applications operated by numerous networked computers are ubiquitous. Information technology (IT) service providers thus must effectively manage and maintain very large-scale infrastructures. An example enterprise environment may have many thousands of devices and hundreds of installed software applications to support. The typical enterprise also uses many different types of central data processors, networking devices, operating systems, storage services, data backup solutions, cloud services, and other resources. These resources are often provided by means of cloud computing, which is the on-demand availability of computer system resources, such as data storage and computing power, over the public internet or other networks without direct active management by the user.

Users of networked computers such as in a cloud-based system may typically log into a computer workstation or client device and are provided a desktop application that displays an interface of applications and data available via the network or cloud. Such desktop applications will be initially accessed when a user logs in, but may remain active to respond to user operation of applications displayed on the desktop interface. While users may activate the desktop application on any computer on the network, most users work from one specific computer.

Remote desktop virtualization solutions have been available for over a decade. These solutions provide virtual desktops to network users. In remote desktop virtualization offerings, there is typically a capability of associating a remote desktop virtualization template in a particular datacenter with a remote desktop virtualization pool in the same datacenter as part of the general configuration model. This remote desktop virtualization template is customized with the image of the right desktop for a particular remote desktop virtualization use case.

In order to offer virtual desktops to users throughout the world, without delay or loss of performance, and allow automatic adjustment of the capabilities based on the needs of desktop users, a global desktop fabric of cloud infrastructure can be implemented. For example, it otherwise takes a great deal of effort to manually replicate the configurations from one regional cloud datacenter to another, so that desktop users in different parts of the world can access a desktop with low network latency. Also, once a desktop has been created in a particular regional cloud datacenter, it is not very easy to move it to a different part of the world. For example, a desktop user may temporarily travel to, or even be permanently transferred to another location that has a much closer network proximity to a different regional cloud datacenter. The desktop client connecting from another part of the world can still connect to the original regional datacenter but only with the possibility of subjecting the desktop user to a significant loss of performance of the virtual desktop and an impacted user experience. This is because, unlike having their own laptop computer, there is a direct performance impact in connecting to a desktop that must be accessed through a remote peer-to-peer network or some other WAN.

A global desktop service system includes a large number of desktop service resources, including many virtual machines, virtual networks, and other services. Managing a global desktop service system, and ensuring that it is running in a performant, secure, and resilient fashion, can become very complex because of the large number of dependencies between desktop users and desktop service resources, and among desktop service resources. For example, there are numerous dependent components of a global desktop service system, any of which can cause a fault in that system that affects components directly or indirectly dependent on them. Such dependent components may include installed client software, endpoint client devices, the network used by the endpoint client devices, cloud APIs provided to manage virtual desktop infrastructure globally, regional resources utilized by cloud infrastructure providers, such as networks, gateway hosts, the virtual desktop hosts, agent services, the virtual desktop operating system, and computing, storage, and network services provided by the cloud infrastructure provider.

Even the normal interactions between these components can be complex, let alone where error conditions occur. As a simplified example of such a normal interaction, the global desktop service provisions both RDP gateways and virtual desktops, and orchestrates access between a client program and a particular virtual desktop. Because dependencies exist between these components, a fault in one of them will cause subsequent ripple effects that can appear as derivative failures. In order to maintain a high level of service availability, it is important that the chain of events that caused the visible problem has a discoverable root cause failure. Each component emits some kind of event trace for troubleshooting purposes, so a fault in any one of them can be individually analyzed to attempt to determine a root cause of the fault.

It is desirable that such a root cause is discovered in real-time, or near-real-time, because the failure can propagate to more users with larger disruption to system operation. Discovering the root cause of a fault can be time-consuming and often requires expert manual intervention, when limited to the standard tools and capabilities of the technologies used to implement global desktop service systems.

However, there are a number of challenges in discovering a root cause of a disruption in real-time. One is the heterogeneous nature of the components of a complex system, as each component may have its own method for gathering detailed event traces. Also, the event traces are often stored in separate data repositories that are globally distributed and exist on separate computer networks. Also, maintaining security of each component may require separate authorization credentials to view such information. Also, separate event traces may by subject to different retention policies that can make it impossible to correlate events across components, because of missing or incomplete information. Also, correlating events across components is difficult because each is typically available in its own time-ordered stream of events. Also, separate event traces may each use a different identification method to uniquely identify important common attributes, such as the identity of the remote virtual desktop involved. For example, one event trace may refer to such a particular virtual desktop by its network name; another by its internal id; another by its network card ID. Expert domain knowledge is usually required to understand the rules of cause-and-effect between traces of events across components. For example, a global desktop service system may reveal that a virtual desktop agent in one region has stopped communicating with the desktop service control plane by reporting a particular pattern of events.

These and other factors make near-real-time identification of the root cause of a fault very difficult. Thus, there is a need for a root cause analysis system that automatically identifies the root cause of a fault in near-real-time in order to maintain high availability for a global desktop service system. Thus, there is also a need for a system that provides confidence scores for different potential root cause diagnosis outputs. There is also a need for a system that allows the collection of events in chronological order from different components to be input into a diagnostic system.

SUMMARY

The disclosed examples are generally directed toward a system and method for determining candidate root causes of a fault in a virtual remote desktop system in near-real-time. The example system analyzes correlated events that are collected from a variety of service components and agents, applying one or more rules that relate events to each other, and/or to configurations of a desktop service control plane, to provide a ranked list of candidate root causes.

One disclosed example is a diagnostic system for determining a root cause of a fault in a virtual remote desktop system providing access to virtual desktops by client devices. The virtual remote desktop system has interconnected service components. An event collection module is coupled to the service components of the desktop system. The event collection module collects events from the service components that are traced to the fault. An aggregation module is coupled to the event collection module. The aggregation module merges the collected events in a time-ordered stream. The aggregation module provides context to the events in the time-ordered stream through relationships between the collected events, and generates a correlated event stream. An analysis system identifies one of the events in the correlated event stream as the likely root cause of the fault in near real-time.

A further implementation of the example system is an embodiment where the identification of the likely root cause includes determining a potential root cause based on a stored rule that includes an input of at least some of the events and an output of a candidate root cause based on at least some of the events. Another implementation is where the rule is one of a plurality of rules. Each of the of rules correlates at least some of the events with a candidate root cause. The diagnosis analysis system executes the plurality of rules to determine candidate root causes. Another implementation is where each of the rules determine a confidence score and a weight score based on the input events. Another implementation is where the analysis system creates a prioritized list of the candidate root causes based on ordering the confidence scores and weights of each of the plurality of rules. Another implementation is where the system includes a knowledge database storing known past error patterns for the components. The analysis system identifies the likely root cause based on matching one of the patterns. Another implementation is where the events are categorized by attributes including a time stamp and a unique event ID, and an event source. Relationships between the events are determined by the attributes. Another implementation is where the correlation module standardizes the attributes of events from different components. Another implementation is where the system includes a configuration repository storing attributes; and a configuration service to provide mapping of attributes between different events. Another implementation is where the service components include at least one of installed client software, endpoint client devices, networks used by endpoint client devices, cloud APIs for managing virtual desktop infrastructure, regional resources, gateway hosts, virtual desktop hosts, agent services, virtual application servers, virtual desktop operating systems, computing services, storage services, and network services. Another implementation is where the system includes a desktop service control plane coupled to the service components and other event sources. The desktop service control plane includes a monitoring service to report faults from the components. Another implementation is where the system includes an event data repository storing the events. The event collection module is coupled to the event data repository and stores collected events to the event data repository. Another implementation is where the analysis system resides in the desktop service control plane. Another implementation is where the system includes a reporting module coupled to the analysis system. The reporting module alerts an operator of the likely root cause. Another implementation is where the system includes a display. The reporting module generates an interface on the display showing the likely root cause and the correlated event stream. Another implementation is where the virtual remote desktop system includes agents monitoring events from the interconnected service components.

Another example is a method for determining a root cause of a fault in a virtual remote desktop system providing virtual desktops to client devices. The virtual remote desktop system has interconnected service components. Events of service components are collected from all service components traced to the fault. The collected events are merged in a time-ordered event stream. The collected events in the time-ordered event stream are correlated to show relationships across events to create a correlated event stream. The correlated event stream is analyzed to determine a candidate root cause of the fault in near real-time.

A further implementation of the example method is an embodiment where the determination of the candidate root cause is based on a stored rule that includes an input of at least some of the events and an output of the candidate root cause based on at least some of the events. Another implementation is where the rule is one of a plurality of rules. Each of the plurality of rules correlates at least some of the events with a candidate root cause. The method includes executing the plurality of rules to determine candidate root causes. Another implementation is where each of the rules determine a confidence score and a weight score based on the input events. Another implementation is where the method includes creating a prioritized list of the candidate root causes based on ordering the confidence scores and weights of each of the plurality of rules. Another implementation is where the method includes storing known past error patterns for the components in a knowledge database. The candidate root cause is determined based on matching one of the patterns. Another implementation is where the method includes categorizing the events by attributes including a time stamp and a unique event ID, and an event source; and determining relationships between the events by the attributes. Another implementation is where the method includes standardizing the attributes of events from different components. Another implementation is where the method includes storing the attributes in a configuration repository; and mapping of attributes between different events via a configuration service. Another implementation is where the service components include at least one of installed client software, endpoint client devices, networks used by endpoint client devices, cloud APIs for managing virtual desktop infrastructure, regional resources, gateway hosts, virtual desktop hosts, agent services, virtual application servers, virtual desktop operating systems, computing services, storage services, and network services. Another implementation is where the method includes reporting faults from the components via a monitoring service of a desktop service control plane. Another implementation is where the method includes storing the events in an event data repository. Another implementation is where the analysis system resides in the desktop service control plane. Another implementation is where the method includes alerting an operator of the candidate root cause. Another implementation is where the method includes generating an interface showing the candidate root cause and the correlated event stream. Another implementation is where the virtual remote desktop system includes agents monitoring events from the interconnected service components.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings, in which:

FIG. 2 is a block diagram of a regional data center and desktop service control plane of the example cloud desktop fabric in FIG. 1;

FIG. 3 is an example of different components of the example cloud desktop fabric and their interrelations;

FIG. 4 is an example table of example requests between different components of the example cloud desktop fabric;

FIG. 5 is a flow diagram of the process of determining a root cause from an example diagnostic system for root cause analysis;

FIG. 7A-7C shows the process of creating a stream of events from different sources in the cloud desktop fabric;

FIG. 8 is a detailed diagram showing the process of analysis performed by the example root cause diagnostic system;

FIG. 9 is an example table of mappings performed by the configuration service;

Figure 1:
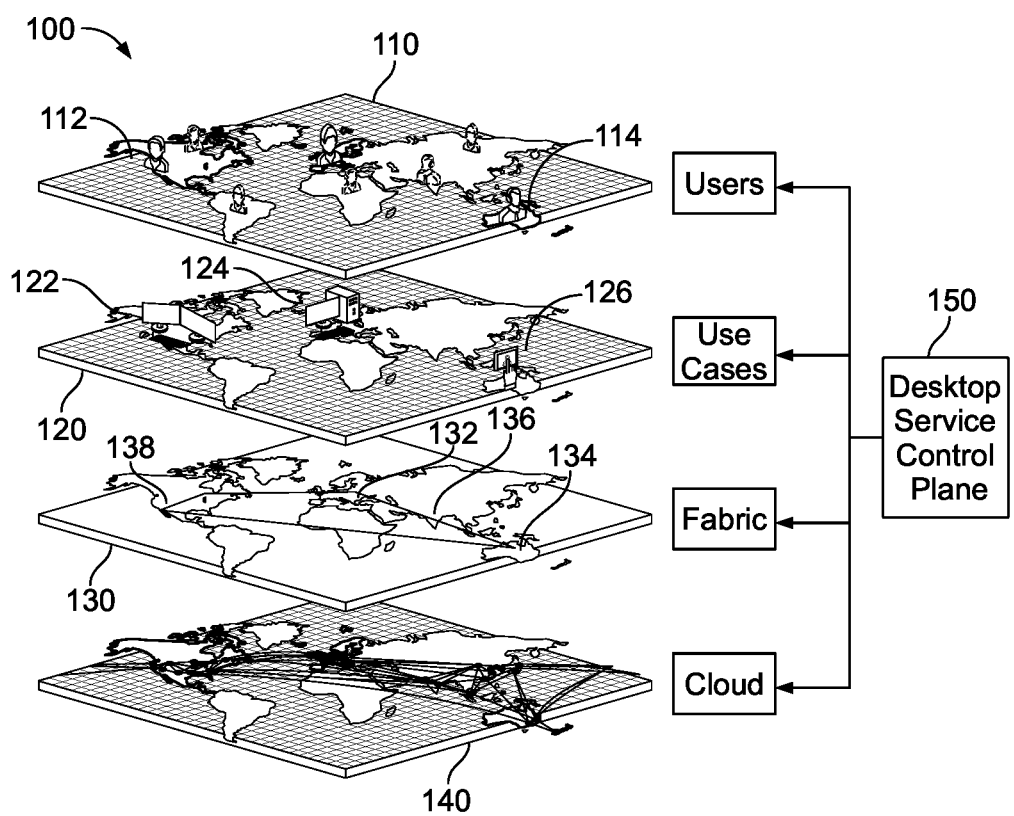
FIG. 1 is a high-level block diagram illustrating an example cloud desktop fabric allowing access to virtual desktops globally.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE ILLUSTRATED EMBODIMENTS

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

The following are definitions of terms used in this disclosure that relate in general to the virtual desktop system.

An agent is software that performs certain operations and monitoring tasks that has direct access to, or runs on, some virtual computing resource and may maintain a duplex communication channel with a desktop service control plane.

An API is a set of specific, controlled, well-defined functional entry points to get, create, update, and delete resources and otherwise change the state of a remote system.

A cloud API is, in this context, an API specific to an Infrastructure as a Service (IaaS) provider.

A connection broker is desktop service resource sometimes used to dynamically connect desktop clients with desktops.

A datacenter is a collection of computing resources, such as servers, in one physical location.

A desktop is a computer's interactive desktop or application, or other experience provided by remote desktop virtualization via a desktop service.

A client, or desktop client (sometimes called a VDI client) is a software application that provides display and input access to a desktop as part of a desktop service. It may be installed on a standard desktop or mobile operating system, or be pre-installed on dedicated hardware devices, or downloaded dynamically via a web browser application, or deployed in some other way. Like an agent, it may also perform certain operations and monitoring tasks and may maintain a duplex communication channel with a desktop service control plane.

A cloud desktop fabric is a scalable virtual desktop interface system that orchestrates multiple regional fabric regions to allow a user anywhere in different regions to access a virtual desktop interface.

A desktop service resource refers to some virtualized hardware, networking service, or virtual machine, other than the desktops themselves, that exists to support a desktop service.

A desktop service is remote desktop virtualization hosted on a public or private cloud, provided as a turnkey managed service.

A desktop service control plane is an application that implements and manages a desktop service.

A desktop user is a person who uses a desktop.

An enterprise connector is a desktop service resource used to integrate the network of a desktop service with the network services, including but not limited to directory services that support authentication and authorization.

A gateway, sometimes referred to as a protocol gateway, is a type of desktop service resource running a service that manages secure access to a desktop supporting protocols including a remote display protocol (RDP). In this disclosure, gateways are accessed as a gateway cluster unless explicitly noted otherwise.

A gateway cluster is a set of gateways managed together for load balancing purposes.

Infrastructure as a service (IaaS) is a set of virtualized computing resources available from a public cloud provider.

An infrastructure template is a collection of desktop service resources and/or definitions that provide a blueprint for replicating a regional cloud datacenter.

A multi-tenant desktop service control plane is a single desktop service control plane implementation that is used by multiple customers in such a way that no single customer is aware of or is impacted by activities of the others.

The term "near-real-time" refers to the processing timeframe of a system in which root cause information is produced without significant delay, close enough in time from the triggering events to be acted upon immediately to achieve business goals, typically measured as under one minute.

A non-persistent desktop user is a desktop user that is allocated a new desktop for each login session.

A persistent desktop user is a desktop user that is allocated a specific desktop for exclusive use over multiple connection sessions.

Pool desktops are a set of desktops managed by the desktop service control plane as a unit.

A regional cloud datacenter is a datacenter providing virtualized computing resources to implement a desktop service for efficient access within a single geography or availability zone.

Remote desktop virtualization is software technology that separates the desktop environment and associated application software from the physical client device that is used to access it in a client/server environment.

A virtual application is the capability to access a user experience for a particular application running remotely.

A virtualized computing resource is a virtual machine that is created by an Infrastructure as a Service (IaaS) provider.

A virtual machine is an emulation of a physical computer that can be accessed over a network.

A virtual network is hardware and software network resources combined into a single, software-based administrative entity, made available by an Infrastructure as a Service (IaaS) provider.

Virtual storage is storage resources provided as part of Infrastructure as a Service.

The following are definitions of terms used in this disclosure that relate to the root cause identification system for the virtual desktop system.

An admin event is an event generated by the desktop service control plane itself as it communicates with other elements of a global desktop service system.

An agent event is an event provided by an event source of a type agent in a global desktop service system. It is typically sent to the desktop service control plane by agent software running on a virtual desktop or other virtual machine.

A candidate root cause is an identified fault that is suspected but not proven to be a root cause.

A client event is an event provided by an event source of type client in a global desktop service system. It is typically sent to the desktop service control plane by client software running on the end-user's endpoint device as part of a global desktop service system.

A defect tracking system is a software application that keeps track of defects reported in development projects, often integrated with project management software or quality management systems.

A diagnostic system is a system that determines candidate root causes for a particular fault context that itself may not be the root cause.

An event is a collection of information about something that occurs within a global desktop service system at a particular point of time, with distinct identity and distinct attributes.

An event attribute is a fact that provides information about one aspect of an event, represented by a name and a value. For example, an event describing a connection between two computers may have a "Connection Source" attribute with value "computer A," and an "Connection Target" attribute with value "computer B."

An event metadata attribute is an event attribute that can be considered to describe information about the sending of the event and not the original event information itself, including annotative attributes added during event analysis. An example of this might be the time an event is received, because this information was not provided as part of the original event attributes.

An event source is something that produces events that can be consumed by a diagnostic service.

An event stream is a time-ordered series of events that are generally more meaningful when analyzed together.

A fault context is some problem report that identifies the starting point for a diagnostic system. In other words, the fault context itself may not be the underlying root cause of the failure. For example, this could be a particular failing interaction with a global desktop service system at a particular time, such as a particular user, or a particular virtual desktop, where the root cause is not immediately understood.

A fully qualified domain name is a common technique to uniquely identify some object by a naming hierarchy as typically found in a Universal Resource Identifier (URI), email address, or any other system that relies on using a network domain as namespace with unique members within the namespace. For example, computer1.mynetwork.mycompany.com.

A knowledge article (KB) is information created and maintained within a KM system about a specific topic.

A knowledge management (KM) system is a tool that facilitates the creating, sharing, using, and managing the information for an organization.

A regular expression is a syntax in which a sequence of characters defines a search pattern for text.

A root cause is an underlying fault somewhere in a global desktop service system that can cause other failures to manifest themselves in a chain of cause-effect relationships. For example, if A fails because of a fault completely within itself, it can cause B to fail. If B fails, it can cause C to fail. Thus, the root cause of failure C is failure A.

A universally unique ID (UUID) is a long number that can be generated in such a way as to be unique for all practical purposes, without the use of a central authority to guarantee that.

FIG. 1 shows a high level block diagram of a cloud desktop service system 100. The cloud desktop service system 100 may also be referenced as a global desktop system because it provides virtual desktops for users globally. The cloud desktop service system 100 includes four layers, a users layer 110, a use cases layer 120, a fabric layer 130, and a cloud layer 140.

The users layer 110 represents desktop users having the same computing needs, that may be located anywhere in the world. In this example, the users layer 110 includes users 112 and 114, who are in geographically remote locations and access desktops via computing devices.

The use cases layer 120 represents common logical global pools of desktops available to serve the users, whereby each global pool is based on a common desktop template. There can be multiple global pools based on which groups users belong to and their job requirements. In this example, the pool for the users 112 and 114 may be one of a developer desktop pool 122, an engineering workstation pool 124, or a call center application pool 126. Pools such as the developer desktop pool 122 or the engineering workstation pool 124 allow users in the pool a desktop that allows access to graphic processing unit (GPU) based applications. Other example applications may include those applications used for the business of the enterprise, for example, ERP (enterprise resource planning) applications or CRM (customer relationship management) applications. These applications allow users to control the inventory of the business, sales, workflow, shipping, payment, product planning, cost analysis, interactions with customers, and so on. Applications associated with an enterprise may include productivity applications, for example, word processing applications, search applications, document viewers, and collaboration applications. Applications associated with an enterprise may also include applications that allow communication between people, for example, email, messaging, web meetings, and so on.

The fabric layer 130 includes definitions and configurations for infrastructure and desktop service resources, including gateways, desktop templates, and others. The resources are maintained as fabric regions such as a master fabric region 132, and expansion fabric regions 134, 136, and 138. As will be explained below, the fabric regions such as the regional fabric regions 134, 136, and 138 can be added or removed as needed. The master fabric region is the configuration of record.

The cloud layer 140 implements the resources defined by the use case layer 120 and fabric layer 130, including virtual desktops, infrastructure, and other virtual resources, all of which are virtual machines or other virtual resources hosted in a public cloud.

The layers 110, 120, 130, and 140 are created and orchestrated by a desktop service control plane 150 that can touch all the layers. The desktop service control plane 150 is a key component to orchestrate a cloud desktop service system such as the cloud desktop service system 100 in FIG. 1. The desktop service control plane 150 can manage the entire lifecycle of a desktop service implementation, from creating and managing the required desktops, to monitoring and analyzing the stream of operational data collected, enforcing security policies, and optimizing the experience for IT administrators and desktop users. For example, the desktop service control plane 150 may register a set of a virtual networks, virtual storage resources, and more. Within a virtual network, the control plane 150 may further register and coordinate the use of gateways, enterprise connectors, desktop templates, connection brokers, and more.

The two desktop users 112 and 114 in different parts of the world who are each able to access an example high-performance desktop service from the cloud desktop service system 100. As will be explained below, the cloud desktop service system 100 eliminates the need to divide users with similar requirements into user groups specific to a region. Rather, all users having similar needs throughout the world are considered as a single worker pool. Users, such as users 112 and 114, each may use a client device to access the desktop service. Client devices may be any device having computing and network functionality, such as a laptop computer, desktop computer, smartphone, or tablet. Client devices execute a desktop client to access remote applications such as the desktop. The client application authenticates user access to the applications. A client device can be a conventional computer system executing, for example, a Microsoft™ Windows™-compatible operating system (OS), Apple™ OS X, and/or a Linux distribution. A client device can also be a client device having computer functionality, such as a personal digital assistant (PDA), mobile telephone, tablet, video game system, etc.

FIG. 2 is a block diagram of some examples of components of the global desktop service system 100, including an example set of desktop clients 210, a regional cloud datacenter 212, and an administration center 214, that interact with and can be orchestrated by the desktop service control plane 150. The desktop client 210 communicates with the desktop service control plane 150 in order to be registered with the fabric, assigned a desktop, remotely configured, and for other purposes. There may be multiple regional cloud datacenters similar to the regional cloud data center 212, but only one data center is shown in detail for simplicity of explanation. The regional cloud datacenter 212 may include a set of protocol gateways 220, a set of managed virtual desktops 222, and a cloud provider operational API 224. These components all communicate with the desktop service control plane 150. Such datacenters include servers that host the various applications. The datacenter typically comprises IT infrastructure that is managed by IT personnel. The IT infrastructure may include servers, network infrastructure, software, and so on. If there is an issue related to an application reported by a user, the IT personnel can check the health of the infrastructure used by the application. A datacenter may include a firewall to control access to the applications hosted by the datacenter. The firewall enables computing devices behind the firewall to access the applications hosted by the datacenter, but prevents computing devices outside the firewall from directly accessing the applications. The firewall may allow devices outside the firewall to access the applications within the firewall using a virtual private network (VPN).

The protocol gateway 220 may be present to provide secure public or internal access to the managed virtual desktops. A gateway agent 230 is software that is deployed on that gateway host by the desktop service control plane 150, and serves to monitor the activity on the gateway 220, and enable the desktop service control plane 150 to assist in configuration and operations management of the gateway.

The example desktop client 210 is software and device hardware available in the local environment of a desktop user 240 to remotely access a managed virtual desktop using a remote desktop protocol. The desktop client 210 communicates with the desktop service control plane 150 and also supports a remote display protocol in order for users to connect to a desktop application run by the regional cloud datacenter 212.

The managed virtual desktop 222 is itself provisioned and maintained by the desktop service control plane 150. A desktop template may be used to manage pools of such managed virtual desktops. The desktop template is configured to provide remote access to the desktop client 210. A desktop agent such as desktop agent 232 is software that is deployed on that managed virtual desktop by the desktop service control plane 150, and serves to monitor the activity on the managed virtual desktop, and enable the desktop service control plane 150 to assist in configuration and operations management of it.

The cloud provider operational application programming interface (API) 224 presents services provided by the cloud provider that also participate in the management of the virtual machine. This can be utilized by a desktop service control plane 150 to perform operations like provisioning or de-provisioning the virtual machine.

Administrative users 242 can interact with network operations center software at the administration center 214 that allows management and administration of the desktop service control plane 150.

Other components and services may interact with the desktop service control plane but are omitted from FIG. 2 for simplicity, such as enterprise connectors, network monitoring services, customer relationship management (CRM) systems, and many others.

The desktop service control plane 150 itself can perform many internal centralized functions also not depicted in in FIG. 2, including pool management, user and group management, cloud service adapters, virtual desktop templates, data analysis, high-availability management, mapping users to the optimal regional data center, security policy management, monitoring, compliance, reporting, and others.

The control plane 150 includes a user and group manager 250, a monitoring service 252, a desktop management service (DMS) 254, an external API (EAPI) 256, and a configuration service (CS) 258. The control plane 150 may access an event data repository 270 and a configuration repository 272. Although only one regional datacenter 212 is shown in detail, it is to be understood that the control plane 150 may facilitate numerous regional datacenters.

The monitoring service 252 makes both routine and error events available to administrators and can analyze operational performance and reliability. The desktop management service 254 interacts with the one or more managed virtual machines (MVMs) 222 in the regional cloud datacenter 212.

The administration center 214 works directly with the data control plane 150 as its primary human interface. The administration center 214 allows the administrative user 242 to configure the functions of the control plane 150 through the configuration service 258. The configuration service 258 supports editing and persistence of definitions about the desktop service, including subscription information and policies.

The global desktop service system 100 includes a large number of desktop service resources, including many virtual machines, virtual networks, and other services. Managing a global desktop service system, and ensuring that it is running in a performant, secure, and resilient fashion, can become very complex because of the large number of dependencies between desktop users and desktop service resources, and among desktop service resources. FIG. 3 shows an example of ordered list of dependent components of a global desktop service system, any of which can cause a fault in that system that affects components directly or indirectly dependent on them. These could include installed client software 310, endpoint client device 312, a network used by the endpoint client device 314, cloud APIs 316 provided to manage virtual desktop infrastructure globally, regional resources 318 utilized by cloud infrastructure providers, such as networks, a gateway host 320 (for example, providing the Remote Desktop Protocol for application virtualization), a virtual desktop host 322, accessible via a protocol such as the Remote Desktop Protocol, agent services 324 that report the health of the virtual desktop host, or virtual application server to a desktop service control plane 150, virtual desktop operating systems 326, such as Windows 10, computing services 328 of the cloud infrastructure provider, storage services 330 of the cloud infrastructure provider, and network services 332 of the cloud infrastructure provider. A regional datacenter such as the regional datacenter 210 may implement all these services.

Even the normal interactions between these components can be complex, let alone error conditions. As a simplified example of such a normal interaction, the global desktop service 100 provisions both RDP gateways and virtual desktops, and orchestrates access between a client program and a particular virtual desktop.

FIG. 4 is an example table 400 that shows example of a sequence of requests made by and responded to from different components in the system 100. The table 400 includes a column 410 showing a requesting component, a column 412 showing the requested action, and a column 414 that shows the component receiving the request. For example, the control plane 150 as a requesting component may requires provisioning a new remote display protocol (RDP) gateway or provisioning a new virtual desktop by the cloud provider. The control plane 150 may then request providing a connection configuration from a client or providing an admin policy change to a virtual desktop. The RDP gateway agent or the virtual desktop agent may then request registering themselves with the control plane 150. The client may then attempt connection to the gateway. Finally, the gateway may request a connection to the virtual desktop. At some future time there may be an administrative policy change that affects the virtual desktop.

Within this sequence, if any preceding request were to fail, that failure disrupts subsequent requests. Faults may occur in any of the example requests or other requests between components. For example, faults that may occur with the virtual desktop agent include: a virtual desktop agent that does not join the customer's network domain because of human error in security credentials; a virtual desktop agent does not come to a ready state because of an issue with the Domain Name System (DNS); and a virtual desktop agent comes to ready state but later appears to be offline, because the virtual machine it is running on was powered down due to power saving settings on the virtual machine operating system. Any of these faults may be the root cause of a larger system failure.

Another example of a fault is when an update image command is invoked for a virtual desktop. The update image command causes the virtual desktop to be powered down and re-imaged, abruptly terminating the remote desktop protocol session in progress and confusing agent software running on it. Another example of a fault may involve a known problem caused by operating system updates (patches). An unplanned yet automatic patch to the desktop operating system (such as Microsoft Windows) is indicated by a particular pattern of events, in which the agent communicates several times in a short period of time and then abruptly stops. The apparent symptom is a series of automated reboots followed by some serious error; the actual root cause may be driver corruption introduced by the operating system patch.

The root cause discovery system explained herein allows a root cause such as those explained above to be discovered in real-time, or near-real-time. This prevents the failure from propagate to more users with larger disruption to system operation. The example root cause analysis that automatically identifies the root cause of a fault in near-real-time in order to maintain high availability for a global desktop service system.

FIG. 5 is a flow diagram of the general operation of the example root cause analysis system. The root cause analysis system first collects data on events (510). Of particular interest are events that themselves indicate failure, but other events that indicate normal connection attempts, responses, reconfigurations, and unexpected event attribute values may also be relevant to root cause analysis and thus are also collected. The system continuously collects these event traces from all global event trace sources in the system under the collection operation 510. The system then merges collected events (512). The diagnostic system thus provides a unified, time-ordered view of the merged event streams, and may standardize common attributes. The diagnostic system then correlates the collected events (514). In correlation, the diagnostic system provides context for event streams by generating additional event attributes to show relationships across events. The diagnostic system can use configuration data provided by a desktop service control plane 150 to discover these relationships. The diagnostic system then analyzes the correlated events (516). In analysis, the diagnostic system evaluates multiple logical rules appropriate to analyze the merged event stream, identify abnormal patterns in the events, match them against event patterns of known problems, and produce a ranked list of candidate root causes. The diagnostic system then produces a report of the analysis (518). The report allows troubleshooting of event streams, and reports the candidate root cause in a specific context.

In addition to a stand-alone diagnostic system, another example implementation of a diagnostic system may be embedded within the desktop service control plane 150 as an integrated diagnostic service. This facilitates the correlation and reporting aspects of the diagnostic system.

Figure 6:
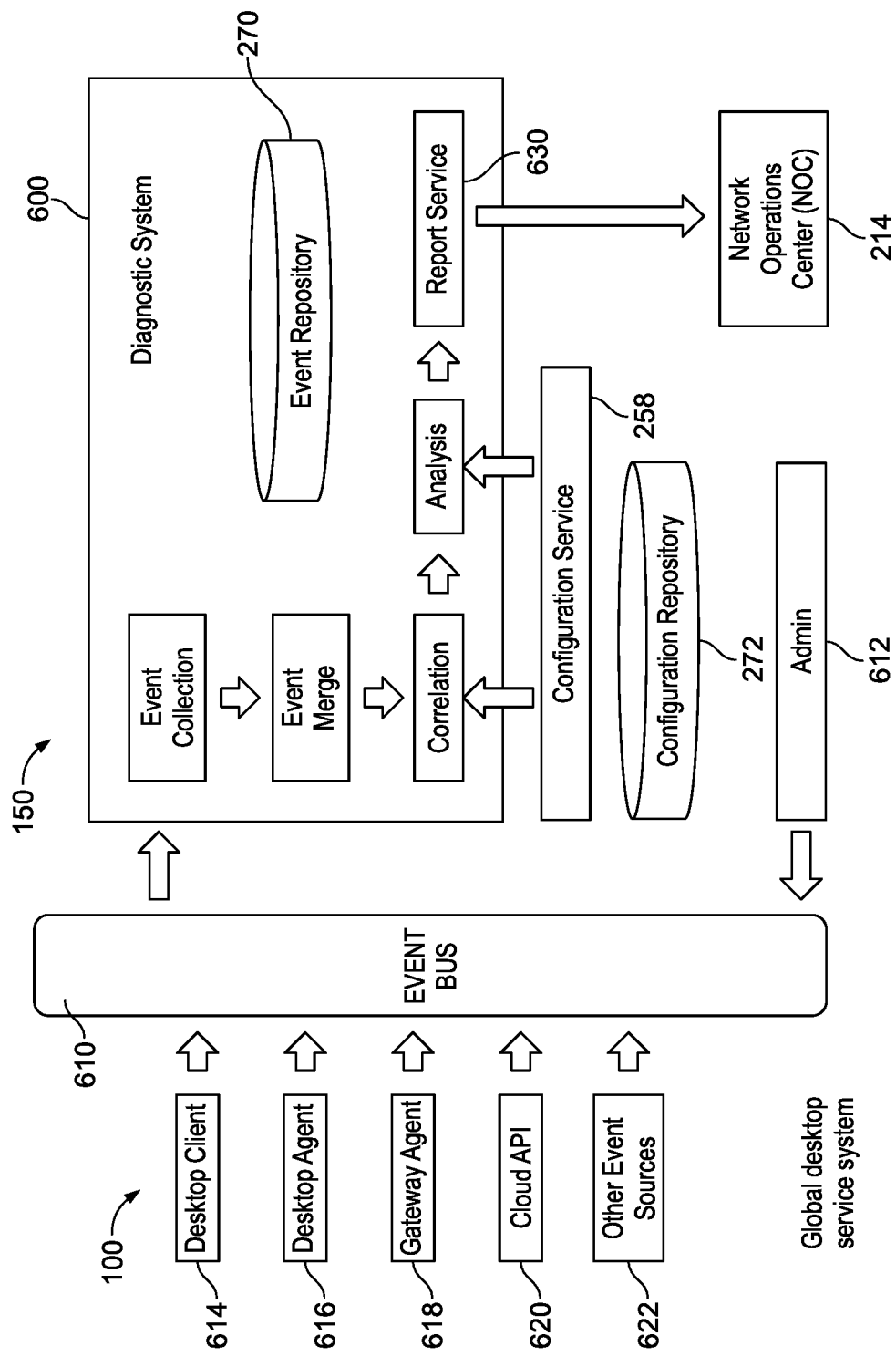
FIG. 6 is a block diagram of an example root cause diagnostic system.

FIG. 6, shows a block diagram of one embodiment of the flow of data processing that may support the root cause analysis. In other implementations, the functions may be combined or organized differently to achieve the same result. An example diagnostic system 600 is executed by the example control service plane 150. As shown in FIG. 6, the example diagnostic system 600 of the desktop service control plane 150 can collect information from different event sources through an event bus 610. The different event sources may include administrative commands 612, desktop clients 614, desktop agents 616, gateway agents 618, cloud API providers 620, and other event sources. As explained in reference to FIG. 5, the diagnostic system 600 merges, correlates, and analyzes the merged event stream to discover the root cause of a fault. It then reports this information to the example network operations center (NOC) of the administrative center 214.

Many different types of events may be collected for the purposes of the diagnostic system. The term "type of event" indicates a particular set of attributes that generally are present in a recurring scenario. For example, a "client connection event" is a type of event that occurs within a global desktop service system when a desktop client establishes a connection with a virtual desktop. Such a type of event may always include attributes such as "connection time", "client ip address", and "virtual desktop ip address." Events are collected from each component acting as an event source. For example, agents may be event sources. Other event sources are not agents but other services, like the Cloud API provider.

Event types typical to a global desktop service system such as the system 100 can include: a client connection success event; a client connection failure event; a virtual desktop session start event; a virtual desktop session termination event; a virtual desktop session status event; a virtual desktop configuration change event; control plane administrative commands; and control plane administrative command responses.

There are various implementations of the event gathering that are possible. In one possible implementation, all events can be forwarded to the single collection service or module in real time as they occur. In other implementations, some or all of the event information may be collected on demand from distributed event repositories throughout the system 100.

In this example, the event bus 610 forwards a copy of event data to the event collection and merge processes of the diagnostic system 600. The correlation and analysis functions also access the configuration service 258 that includes data stored in the configuration repository 272. In this example, the collected event data is stored in the event repository 270. The diagnostics system 600 includes a report service 630 that generates a report on root cause analysis. The generated report on root cause analysis is sent to the administrative center 214.

Figure 7A:
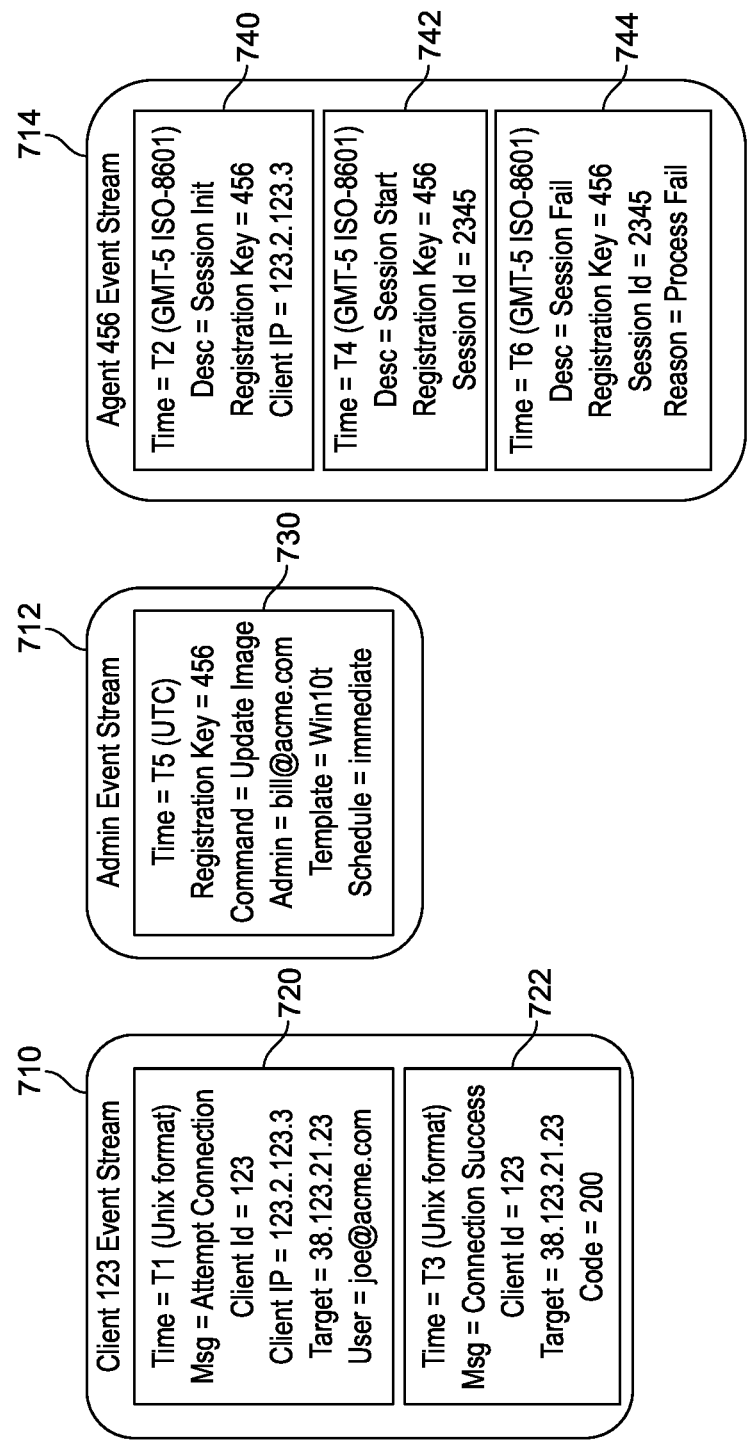

FIG. 7A shows an example of collection of event data. FIG. 7A shows three separate event streams 710, 712, and 714. In this example, the event stream 710 is collected from a client (123), the event stream 712 is collected by an admin, and the event stream 712 is collected from an agent (456). There are only three event streams for three example components for purposes of illustration. These are examples of events that may be collected by any of the components in FIG. 3. There may be multiple components that each report their own event stream.

Each of the event streams 712, 714, and 716 have at least one event that occurs in a time sequence. Thus, the event stream 710 includes an event 720 occurring at time T1 and an event 722 occurring at time T3. The event stream 712 in this example includes an event 730 occurring at time T5. The event stream 712 includes an event 740 occurring at time T2, an event 742 occurring at time T4, and an event 744 occurring at time T6.

The example events 720, 722, 730, 740, 742, and 744 consist of attribute name/value pairs that are described within FIG. 7A in the format of {Attribute Name}={Attribute Value}. For example, the event 720 at time T1 includes an attribute name/value pair of "Client IP=123.2.123.3", signifying that there is an attribute named "Client IP" with the specified IP Address. This particular format is used to illustrate the concept of the information contained within an event; many other representations of the information of an event are possible.

In FIG. 7A, the two events 720 and 722 from source Client 123 indicate that a connection was attempted to a particular target at time T1, and succeeded at time T3. The single event 730 from the admin source indicates that an update image command was sent at time T5. The three events 740, 742, and 744 with source agent 456 indicate that a session was initiated by the client at time T2, that it successfully started at time T4, but it failed at time T6.

During the event collection phase, all of these events are captured and may be logged, indexed, or otherwise made available to a diagnostic service implementation. The event merge phase standardizes the events depicted in FIG. 7A and creates a single chronologically-ordered stream.

A standard attribute of all events is the date/time of the event. The collected events may arrive with inconsistent date/time representations, including different time-zone contexts, depending on the event source. For example, there could be an event source that provides date/time in a localized date/time format, such as 04/01/2020 5:32 am EST. Another event source might provide the date/time in a representation such as 202004011303200 with the time-zone understood to be GMT. Another event source may provide it using the Unix time format, such as 1597781329. The last three example representations all refer to the same moment. This concept can be extended to the millisecond level. The event merge service provides a way to order these events in absolute chronological order, regardless of the date/time representation.

Another standard attribute of all events is a unique event id. Each event in the merged collection can have a globally unique identifier based on the event sources and unique ids, if any, or is given a globally unique identification using a technique such as GUID generation.

Another standard attribute of all events is the event source. This is often represented as a category of event source, such as "client", combined with a unique identifier within that category, such as "123". In some implementations, the source type and source id could be represented as separate attributes. Another method is to create a globally unique identifier that maps to attributes about every unique endpoint. In the example implementation, the source id can be represented as "client:123". There are many other possible representations for the event sources.

Another standard attribute of all events is a notion of event type. This standard type identification will be unique across the event source. The standard type allows events to have their context identified within their particular event source that gives an understanding of the event's purpose. Typically, this is achieved by mapping one or more attribute names and/or values from the original event into the type attribute.

For example, one type of event from a "client" event source would be carry a "Msg" attribute with value "Connection Attempt". The event merge service maps the "Msg" attribute to "Type" for events arriving from clients. Another technique is to combine an attribute name and value. For example, an event with attribute name "Command" and attribute value "Update Image" can be mapped to an event type of "Update Image Command", because the value modifies the attribute name in a meaningful way.

For some event sources, a hierarchical type system using multiple attributes to identify sub-types, sub-sub-types, and so on may be used. These can be mapped to a standard type attribute as well. For example, the combination of attributes "Category=Error" and "Subcategory=Protocol" could result in a standard event type of "Protocol Error." This effectively flattens and simplifies the hierarchy into a single standard representation.

Finally, other attributes within events are preserved within the merged event stream, as they can vary based on the event source, type of event, and other dynamic contexts. For example, an event from a "client" event source with type "Attempt Connection" may include an attribute identifying the "Target Computer" it was attempting to connect to. This non-standard attribute is preserved within the merged event stream for detailed troubleshooting and analysis.

Figure 7B:
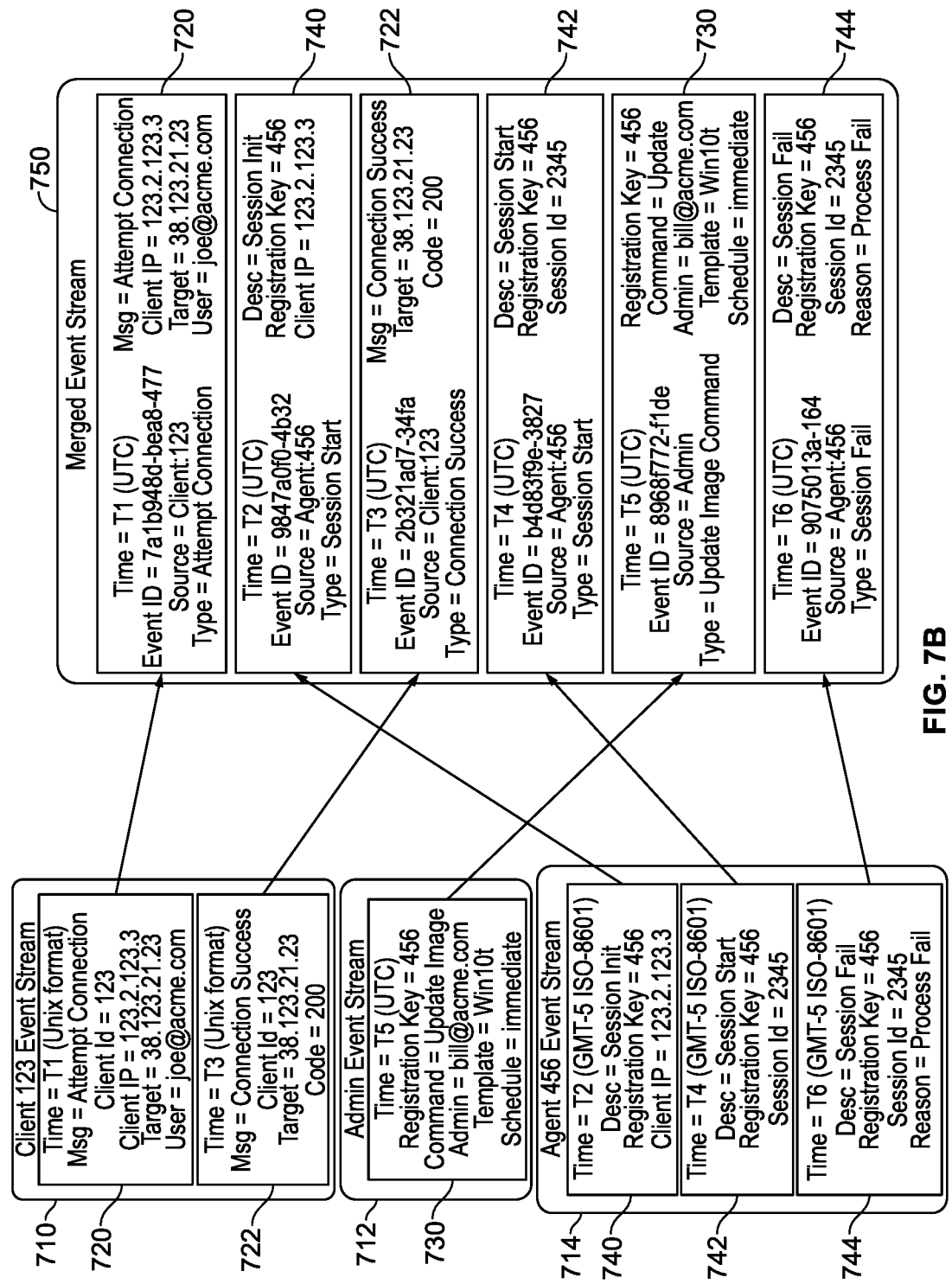

In FIG. 7B, the six events 720, 722, 730, 740, 742, and 744 in FIG. 7A are illustrated to be interleaved so as to form a single chronological stream 750, in the order of the time the events occur (e.g., event 720 at T1, event 740 at T2, event 722 at T3, event 742 at T4, event 730 at T5, and event 744 at T6).

Furthermore, standardized metadata attributes are added to each event in the merged event stream, as described earlier. In FIG. 7B, these attributes are depicted in bold font. In this example, the attributes include Time, EventID, Type, and Source. Of course, other attributes could be included in each of the events. In this example, the time attribute of each event is a standardized date/time UTC representation and matches the chronological order of the stream. In this example, the EventID attribute of each event is represented using a universally unique identifier (UUID). In this example, the Source attribute of each event is represented as the source type and unique identifier combined together. In this example, the Type attribute of each event is mapped from one or more of the attributes and/or attribute values in the original event.

The original attributes, which are not necessarily standardized, and may exist only in the case of specific event sources and/or types, may also be preserved for each event in the merged event stream, such as the target attribute of events with the event type "Attempt Connection." These are illustrated in non-bold font text in the right-hand column of the merged event stream 750 in FIG. 7B.

To prepare for fault analysis, the diagnostic system 600 provides context for event streams, by understanding and reconciling divergent representations of event attributes from different event trace sources. In some implementations, this processing may occur at the same time as the merging of event streams. In other implementations, the processing may occur in a subsequent phase either as events arrive, on an as-needed basis, or on a periodic basis.

In any case, the product is a correlated event stream that includes more standard metadata attributes for the purpose of relating event streams to particular troubleshooting contexts. This is useful for further analysis of the fault, whether performed by an automated analysis service, or via a manual process with human expert knowledge.

One example of how this context can be used is troubleshooting a problem reported for a particular virtual desktop that has been assigned to multiple users over time. The time-ordered listing of all events during a particular time period that are related to a particular virtual desktop host, regardless of end user, gives a desktop-specific perspective to the event stream.

Similarly, it is helpful when troubleshooting a problem reported for a particular user who may have been using multiple desktops over time. The time-ordered listing of all events during a particular time period that are related to a particular end-user, regardless of what virtual desktop host is involved, gives a user-specific perspective to the event stream.

FIG. 7C illustrates an example correlation result 760 using the example stream from FIG. 7B. The merged event stream is shown in the same format as FIG. 7B with the events 720, 722, 730, 740, 742, and 744 in time event order, but illustrates that it has been further processed to correlate events by two new standardized attributes: a UserID and a DesktopID 770 (shown in bold-face font). To simplify the illustration of the concept, FIG. 7B shows a series of events that happen to be related to the same particular end user and the same particular virtual desktop. This correlation is used to provide various kinds of linkages across events in order to prepare the event stream 750 in FIG. 7B for cause-effect fault analysis.

FIG. 8 is a block diagram of the components of the diagnostic system 600. The diagnostic system 600 includes a correlation service 810 that produces a correlated event stream 812 that exemplified by the correlated event stream result 760 in FIG. 7C. A context input 820 and the configuration service 258 provide additional inputs. Thus, context data from the context input 820 is a starting point for analysis that may be derived from a notification of a failure of a component in the system 100. The context data from the context input 820, correlated event stream 812, and mapping information from the configuration service 258 are fed into an analysis service 830. The analysis service 830 accesses the event repository 270 and a knowledge database 832. The knowledge database 832 stores known error patterns for the different components of the system 100. The analysis service applies a set of rules 834 to product root cause candidates 840. The candidates are sent to the reporting service 630.

The event correlation service 810 creates these linkages using information from the events themselves, as well as the configuration service 258. In this example, the configuration service 258 accesses the configuration repository 272 for information maintained by the global desktop service system 100 as explained above.

FIG. 9 shows a table 900 that illustrates the kind of mapping information that may be maintained by the configuration service 258 that can support the correlation service 810. One side of the table 800 shows a mapping of registration keys to desktop IDs performed by the configuration service 258. The other side of the table 800 shows a mapping of the desktop IDs to user IDs.

In this example, one event source identifies a virtual desktop host by a unique registration key, while another event source identifies the same virtual desktop host by a fully qualified domain name. The desktop service control plane 150 maintains a mapping of registration keys to fully qualified domain names. When needed, the diagnostic system 600 can normalize an attribute such as a registration key to enable cross-referencing with an event that identifies virtual desktop hosts only by their fully qualified domain name. This allows an event stream to understand the relationships between events from diverse event sources.

In some implementations the relationships may be determined as a de-normalization of linked events by mapping and copying these attribute values as every event is received; in others, the linkage may be performed dynamically through a mechanism such as a database with joins and/or indexed foreign keys, and the correlation happens on demand during analysis.

Using the example information as shown in the correlated table 760 in FIG. 7C, each event is correlated to a UserID and DesktopID such as the UserID and Desktop ID 770 of the event 720 by the correlation service 810. The event 720 at time T1 is correlated to a standard UserID by mapping the event directly to the User attribute of a client event. The DesktopID is looked up from the configuration service 258. The configuration service 258 maintains a mapping of UserIDs to assigned desktops as shown in FIG. 9. The events 740, 742, and 744 at time T2, time T4, and time T6 are all agent events. They are correlated to a standard DesktopID and UserID by looking them up from the configuration service 258, that maintains a mapping of Registration Key to a DesktopID, and also a DesktopID assigned to a UserID as shown in the table 900 in FIG. 9.

The event 722 at time T3 can be correlated using event information already encountered in this stream, in which the source, Client:123, was already associated with this UserID and DesktopID. This is an example of optimizing the implementation by avoiding repeatedly mapping the attributes from the configuration shown in FIG. 9.

The event 730 at time T5 is an admin event, but also includes a Registration Key and therefore is correlated in the same fashion as the events 740, 742, and 744 at time T2, time T4, and time T6.

FIGS. 7A-7C show an example of correlating events only by UserID and DesktopID. However, this method is not limited to supporting these troubleshooting contexts as there are many other useful correlations possible, that similarly identify the commonality between events that arrive with different representations of the same objects. For example, the troubleshooting context could be a particular connection between a particular virtual machine (VM) client and a VM desktop. Connection details such as the source and target IP address pair may be used to correlate between event sources that communicate with each other using a network protocol such as TCP/IP. Another example is correlating events by a particular customer context, such as the customer's unique database account information. This could be used in a global desktop service system that is shared between customers in such a way that each customer has own identified database account or other unique identification in a multi-tenant system, that may be mapped into a unique customer id maintained by the desktop service control plane 150.

Events may share certain contextual identification, such as a SessionID, that can be used to link events across event sources. The system may collect event traces from an event trace source that identifies users by a unique identifier such as a UUID. The desktop service control plane can map this identifier into a fully qualified login id, such as the email address of the user.

Because the events can be fully cross-referenced, the diagnostic system 600 can also support a hyperlinked view of events. For example, analysis of the fault can allow administrators to transition from the context of troubleshooting a particular user's events to the context of troubleshooting a particular virtual desktop assigned to that user.

In order to support automated near-real-time root cause analysis, the diagnostic system can also support the matching of event trace streams using known problem event stream patterns.

Returning to FIG. 8, a high-level overview of an automated near-real-time root cause analysis process is shown performed by the diagnosis system 600. The analysis service 830 applies one or more of the rules 834 to report candidate root causes for a particular context. Each of the rules 834 may be implemented in various ways, and have access to various sources of information. The rules may be all applied to build a list of all candidate root causes, or analysis could stop when any of the rules 834 determines a root cause. For example, a rule could specifically evaluate a candidate root cause that the associated VM desktop experienced an operating system update during a connection session.

The analysis process of the analysis service 830 is triggered when a particular context is applied as input. For example, one context could be that a particular user "jdoe@acme.com" experienced a failure of a virtual desktop at a time corresponding in some degree to time T6. One source of information available to the diagnostic system 600 is the correlated event trace stream 760 described in FIG. 7C.

Another source of information available to the diagnostic system 600 may be the configuration settings database 272 for entire global desktop service system 100, an example of which is described in FIG. 2 and FIG. 8. Some examples of the types of relevant information in the configuration settings database can include multiplicities of: registered users, registered groups, user or group entitlements, attributes of a virtual desktop pool, and the registry or other configuration setting of a virtual machine (VM) hosting a virtual desktop, such as power management settings, attributes of remote desktop applications, attribute of a virtual desktop configuration and other policy configurations that affect behavior of some component. Furthermore, the configuration settings database 272 can include linkage information describing the relationships of these settings to each other.

Another source of information available to the diagnostic system 600 may be the known error patterns stored in the knowledge database 832. For example, if present, the knowledge database 832 may include information that a particular sequence results in a known problem. The knowledge database 832 can provide data to supplement the logic of the rules 834. For example, the knowledge database 832 could include a description of patterns that apply to a particular class of users, or a particular class of virtual desktops.

An example of such a useful pattern is to identify missing events that were expected in a particular scenario. For example, a pattern might exist that indicates the expected sequence of events during provisioning is agent registration, followed by session initialization, followed by at least three session information updates within 10 minutes. Absence of the session information updates could indicate a problem with a recent operating system patch update. A rule could compare the actual pattern and identify the patch update as a candidate root cause, even though there is no positive evidence of that other than missing expected events.

Also, tracking past event patterns can help to determine the confidence rating of the root cause identification. These could be used to dynamically activate or de-activate certain rules to improve the rule evaluation process. Also, the knowledge base can take note of repeated patterns during the same time period, and this can help determine if a fault is isolated or has a larger "blast radius" of affected components in the system 100. The blast radius is the components affected by the fault in the system 100 and analysis of disruption that may be or has been experienced by users dependent on these components. The output of the analysis service 830 includes a list of root cause candidates. Each root cause candidate is described in terms of the root cause event attributes.

Some implementations of the analysis service 830 can also assign each root cause candidate a confidence factor. Thus, if multiple rules generate candidate root causes, there can be criteria for ranking them in terms of probability, and this level of uncertainty may be passed to the reporting service to assist the business logic of the consumers of this information. The level of uncertainty may be determined in different ways. For example, the frequency of a specific root cause in previous occurrences of faults or known problems may be tracked. Other factors may include the exactness of the matching performed by the rules, or any other logic specific to the underlying system, and implementation of the rule.

Some implementations of the analysis service 830 can also assign each rule 834 a weight factor. This is similar to the confidence score, but applies specifically to the rule, and not to any particular event being processed. In this example, the confidence score is output along with any candidate root cause. This may be a built-in attribute of each rule of the rules 834. The weight of the rule identifies the perceived quality of the rule in determining respective root causes.

Both the confidence and weight factors of a root cause candidate may be used in creating a prioritized list of root causes, in order of importance, and can help consumers of the analysis understand the results when multiple rules may generate conflicting answers. For example, if one candidate root cause is that the network failed, but another candidate root cause is that it is a virtual desktop running out of memory due to a configuration problem, the relative weight and confidence factors can be used to decide which is the more likely root cause. Alternatives root causes are recorded if the determination of the most likely root cause is later discovered to be incorrect to provide assistance in the diagnosis.

One example of a root cause determination may be made when a desktop user is unable to connect to their assigned virtual desktop in a global desktop service system such as the system 100. In this example, the end user has experienced a known problem: virtual desktops sometimes power themselves down unexpectedly, leaving users unable to connect to them. The troubleshooting context is a particular user, a particular time, and a particular symptom (sudden disconnection and inability to re-connect). One candidate root cause is a by-product of the ability of the desktop service control plane 150 in FIG. 2 to remotely re-initialize a virtual machine with a new core image. If the reinitialization occurs at the wrong time, the session with a particular client is disrupted, and the desktop service control plane 150 will report a failure of the desktop agent 232 on that virtual desktop, because the desktop agent itself has suddenly been disconnected from the desktop service control plane 150 and is not responsive.

Figure 10:
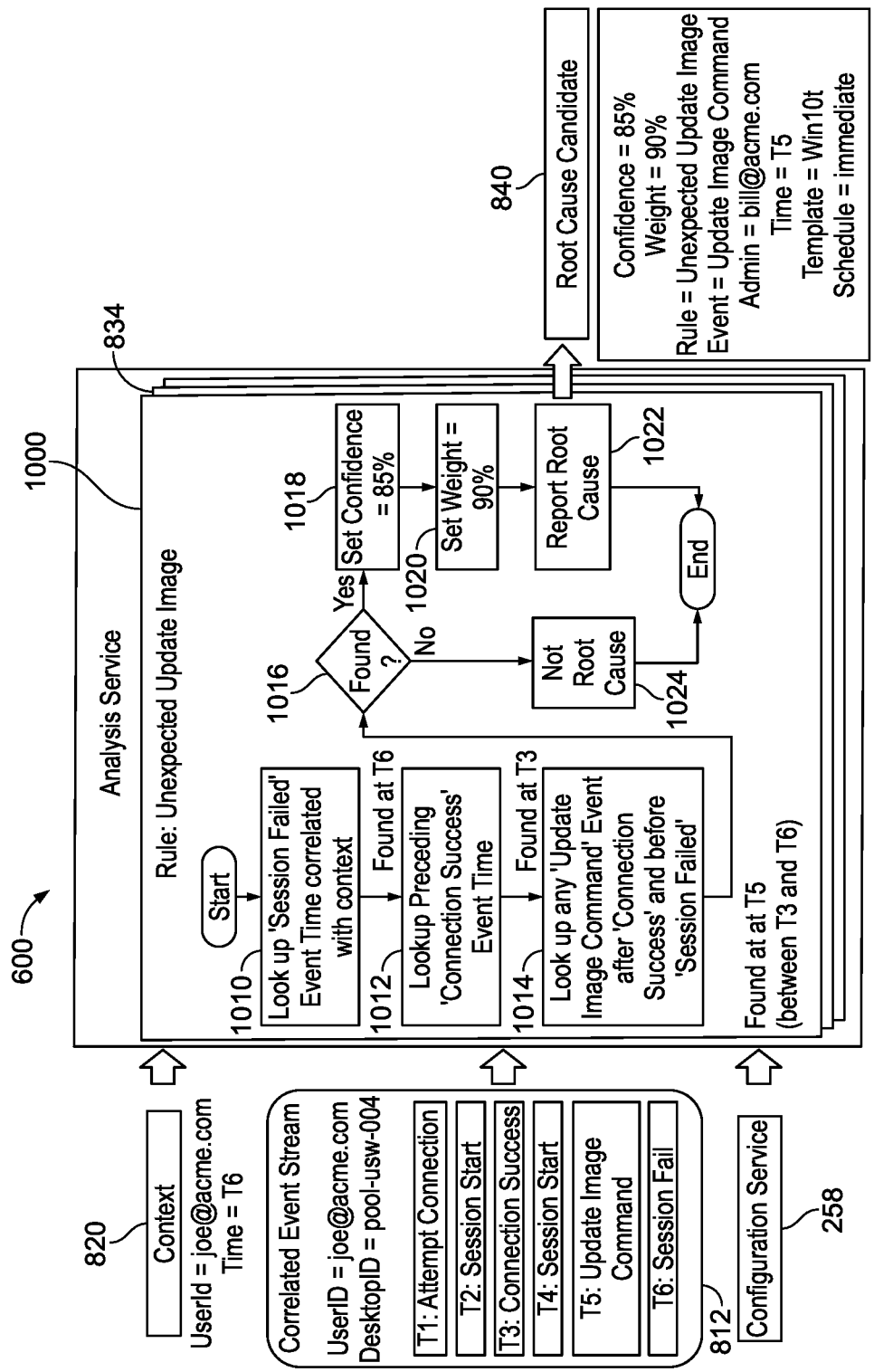
FIG. 10 is an example rule for determining root causes in the root cause diagnostic system in FIG. 6.

FIG. 10 shows an example application of specific rules used by the diagnosis system 600 to identify candidate root causes in this case. FIG. 10 depicts more detail for an example rule 1000 that is designed to identify this particular root cause, along with the context of this example: user joe@acme.com experienced session failure around time T6. The diagram includes a simplified depiction of the correlated event stream using the diagnostic system 600 in FIG. 6.

The rule 1000 determines if an administrative update image command occurred to the faulty virtual desktop, by examining the correlated event stream leading up to the time of the fault given the context of the fault. The illustration of the rule 1000 in FIG. 10 employs a visual syntax similar to Business Process Model and Notation (BMPN), that is itself similar to notation used in flowcharts. Steps are represented as rectangles, and decision points as diamonds. Ovals represent the start and end of the logical flow, and arrows show the flow between steps and decision points. This visual syntax is shown purely for illustrative purposes.

The example rules 834 in FIG. 8 or example rule 1000 in FIG. 10 can be implemented in a variety of ways, including procedural computer code, a computer script, a Business Process Automation system, or a backward-chaining rule engine. Another extended implementation of rule execution is to allow rules to be encoded using declarative formats that minimize the need to specify rules in procedural computer programs, allowing the rules to be more customizable and better adapt to dynamically changing conditions. One example of this is the use of a syntax such as regular expression language to identify patterns within events as part of the code's configuration.

The rule name itself can be useful information if the rule's condition is evaluated as true. The example logical rule 1000 in FIG. 10 is titled, "Unexpected Update Image." In this example, the rule 1000 first identifies the occurrence of a baseline "session failed" event to match the given context (1010). The identified occurrence might not have to be an exact match. If the analysis is triggered relating to a session failure at 7:00 pm on a particular day, there could be a range of event times that identify a likely matching event. In this example, the event 744 at T6 in FIG. 7C is identified Implicitly (not shown here for clarity), if no such event is found, the service reports this situation as an exception and the rule evaluation is terminated. Assuming the event is found, the rule 1000 then identifies the 'Connection Success' event that precedes the 'Session Failed' event (1012), by walking through the stream in reverse order from the event at T6, the connection success event is identified at time T3.

Assuming it is found, the rule 1000 then searches for any 'Update Image' event happening between times T3 and T6 (1014). The example rule 1000 is designed to treat such an event as having a suspicion of being the cause of the fault. This is because the event happened in the time sequence at such a place as to explain a sudden session failure after connection had successfully occurred. In this example, the rule 1000 finds such an update event at time T5.

The rule then includes a decision point that simply looks at whether a suspicious administrative command was found (1016). If at the decision point (1014), no suspicious administrative command was found, the rule concludes that the events of the rule (e.g., an unexpected update image) is not the root cause of the failure (1024) and ends without a report of a root cause candidate.

Alternatively, if the administrative command is found, the rule proceeds to evaluate the confidence level of the output (in this example, 85% probability) (1018). The determination of a confidence level may be determined in a large variety of ways specific to the rule, that are not shown in the example in FIG. 10. In the example shown in FIG. 10, the confidence level is simply assigned to a static value by the rule. In a more dynamic example, the time gap between the administrative command and the failure may be considered, where a larger gap lowers the confidence level. Another example might use a knowledge base look up to find the frequency of this failure pattern and incorporate the frequency in determining the confidence level.

Continuing with this example, the system then checks the rule's assigned weight (90%) and outputs that as well (1020). Similar to the confidence level, the weight assignment logic can vary depending on the implementation of the rule and the rule engine. The rule 1000 formats the information, including the name of the rule, the attributes of the event at time T5, and the computed confidence and weight, and reports the candidate root cause (1022). The rule 1000 creates a candidate root cause 840 that is added to the list of candidate root causes. The computed confidence and weight can be used to maintain this list in priority order.

A more elaborate version of this rule might perform additional checks before reporting a configuration change as the root cause. For example, it might do a search of a knowledge base to see if the particular Update Image command with a schedule setting of "immediate" has been associated with sudden session failure. Such additional checks may increase the confidence level in step 1018 as noted above.

Furthermore, the example just described in FIG. 10 shows one example way to implement analysis rules. Other ways could include doing analysis on large data sets to find anomalous patterns, neural networks, or other techniques.

Once a candidate root cause has been identified, information about it is made available to support staff or others to make use of that information. The root cause reporting service 630 may provide interfaces, and/or may provide information to a separate network operations center service portal. The example root cause reporting service 630 may provide integration with a fault-tracking system operated by the desktop service control plane 150. The example root cause reporting service 530 may provide integration with an alert notification system operated by the desktop service control plane 150. The root cause reporting service 630 may be integrated with a blast radius evaluation and reporting system operated by the desktop service control plane 150 that will analyze the potential impact of this fault on other users. The example root cause reporting service 630 may trigger further actions to repair the fault. The output analysis may be integrated with logic to automate the creation of knowledge articles in the knowledge database 832 to help identify new occurrences of the same fault.

Figure 11:
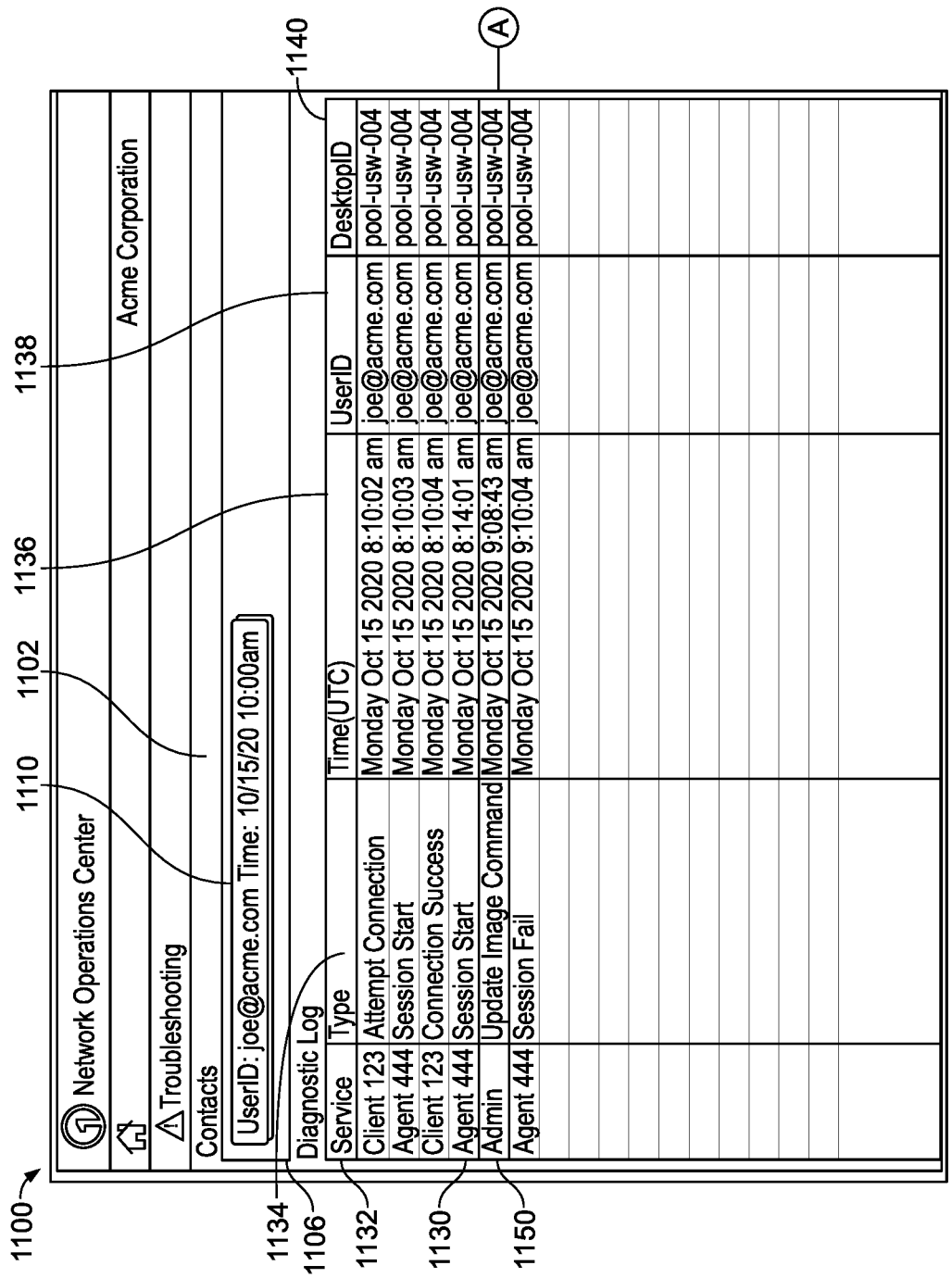
FIG. 11 is an example interface generated to assist in root cause determination.
Figure 11:
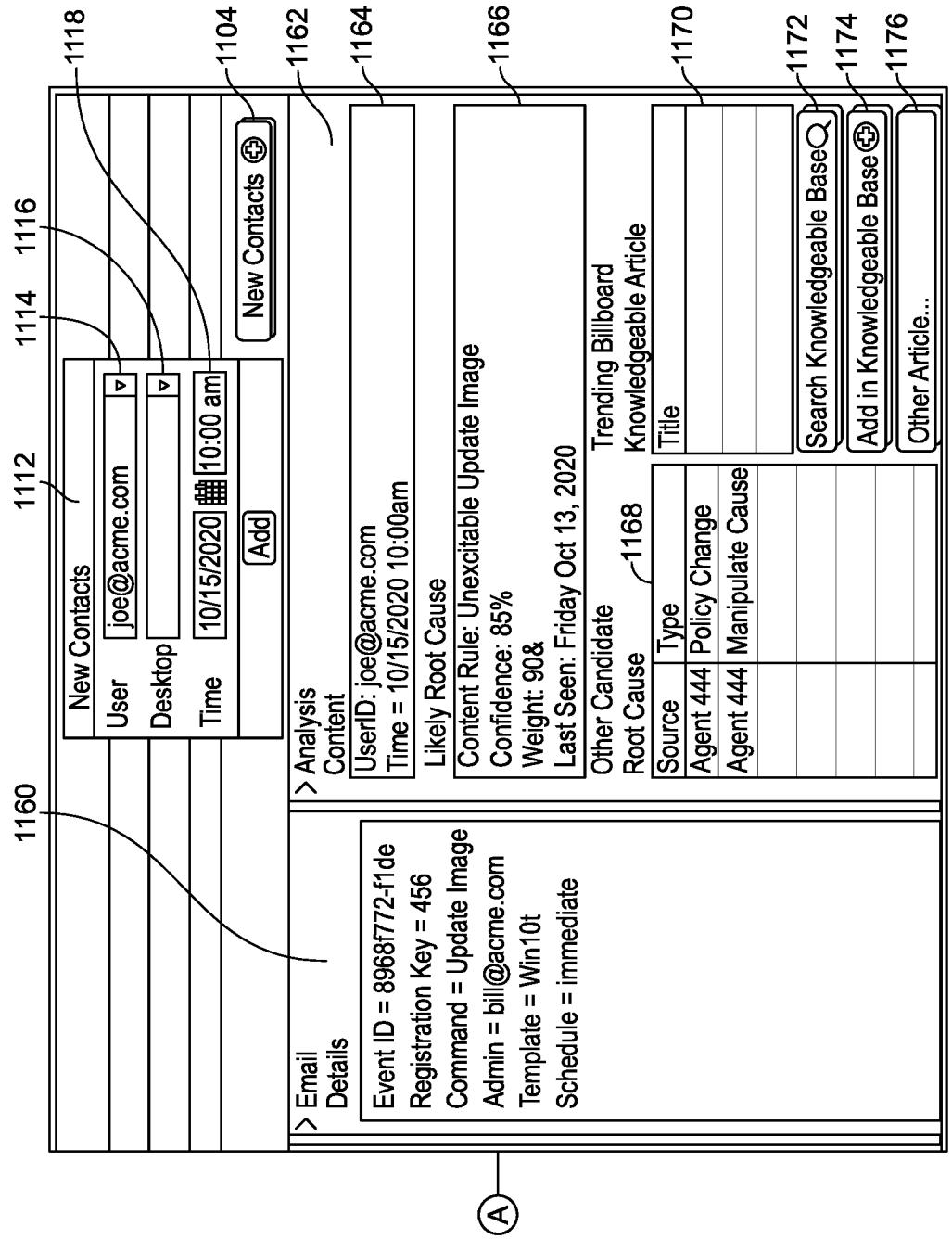

FIG. 11 shows an example of a network operations center user interface 1100 that illustrates some of the possible uses of the correlated event stream for a given context. It is to be understood that the example interface 1100 depicts some but not all of the various integrations and extended functionality made possible by the diagnostic system 600. The example interface 1100 includes a contexts panel 1102, a new context button 1104, and a diagnostic log table 1106.

The contexts panel 1102 shows a single annotation 1110 representing one context for a particular user that experienced a problem in a particular rough timeframe. In this example, the context of the annotation 1110 corresponds to the example correlated event stream 760 shown in FIG. 7C. Although only one annotation 1110 is shown, there may be multiple contexts displayed simultaneously in the contexts panel 1102.

Selecting the new context button 1104 will display a new context dialog box 1112, that can capture a new context to be added to the screen. The new context dialog box 1112 includes a user field 1114, a desktop field 1116 and a time field 1118. These allow a user to add a new context by selecting a user from a drop down menu to populate the user field 1114, a desktop from a drop down menu to populate the desktop field 116 and a time from the time field 1118.

The diagnostic log table 1106 displays the correlated event stream in chronological order. Each of the rows 1130 show data relating to each listed event. The table 1106 includes columns of standard attributes. The columns include a source column 1132, type column 1134, a time column 1136, a user ID column 1138, and a Desktop ID column 1140. The columns match the standard attributes produced the example correlated event stream shown in FIG. 7C. The source column 1132 describes each event source. The type column 1134 describes the event type. The time column 1136 shows the time in the standardized time representation of the event. The UserID and DesktopID columns 1138 and 1140 are the correlated attributes in this example. If other correlations are implemented, they could be shown in such a table as well. The DesktopID values in the DesktopID column 1140 are shown as hyperlinks, representing the ability to easily add a new context to change the perspective of troubleshooting from UserID to DesktopID.

In this example, a fifth row 1150 of the table 1106 depicts a candidate root cause, as identified by the root cause analysis service 600 in FIG. 8, by appearing in a different color such as red. Selection of an event corresponding to one of the rows of the table 1106 causes an event panel 1160 and an analysis panel 1162 to be displayed as for the selected event in the fifth row 1150.

The event panel 1160 displays all the other attributes of the selected event that do not appear in the table 1106. In this example interface, any event's full attributes, meta-data, or other relevant details may be similarly examined. For example, the attributes include the event ID, registration key, command, admin identity, template, and schedule in this example.

The analysis panel 1162 displays the output of the analysis service 600 in FIG. 8. These outputs are additional details in addition to the event attributes displayed in the event panel 1160, and more tools. The analysis panel 1162 includes a context display 1164, a likely root cause display 1166, an other candidate root cause table 1168, a trending related knowledge articles table 1170, a search knowledge base button 1172, an add to knowledge base button 1174, and an other actions button 1176.

The context display 1164 shows the attributes that were used to trigger the analysis. The likely root cause display 1166 shows information about the root cause selected as the most likely, which could be configured to be the rule evaluated with the highest confidence, weight, some combination of these, or some other logic. Details about the rule evaluation can be displayed, including the confidence, the weight, and the last seen time. The last seen time shows the most recent time (if ever) the same rule identified this particular root case for this or some other context. This is useful for troubleshooting in that it reveals if the root cause is isolated or it if occurring frequently as part of a pattern.

The other candidate root cause table 1168 shows other candidate root causes that may have been identified by the analysis service 600. The other candidate root causes have lower priority, due to lower confidence and or weight factors in comparison with the primary root cause.

The trending related knowledge articles table 1170 table illustrates one implementation in which the diagnostic service is integrated with a knowledge management system. Links to related articles or other documentation with a high relevance to this root cause are displayed. Although not depicted in FIG. 11, the interface could be extended to show the same information for other candidate root causes as are shown for the likely root case, including the confidence factor, weight, last seen time, or any other relevant properties, so that an administrator may compare them.

The search knowledge base button 1172 illustrates one implementation in a search of a knowledge management system is made with a single click to discover similarity with existing known problems and/or information about how to respond to such problems. The search may be made in relation to a knowledge database accessible by the service plane 150.

The add to knowledge base button 1174 can exist to allow a user to add the event to the knowledge database. This feature illustrates the ability to integrate the diagnostic service with a knowledge management system to provide feedback to that system about a newly discovered event pattern. Collected discovered events can assist future troubleshooting of a reoccurrence of the problem. In some implementations all identified problem patterns including the root cause could be automatically captured by a knowledge base system as a distinct knowledge article. An operator can control this process and enhance the information by actions such as annotating root causes with more relevant contextual information, adding links to customer service histories, screening out duplicates, and adding relevant meta-data.

The other actions button 1176 allows the operator to access additional actions related to the diagnostics services. In this example, the other actions may include launching actions such as: providing feedback that some, or perhaps all, of the candidate root causes shown are inaccurate; selecting one of the other candidate root causes as the most likely based on external knowledge or expertise; sending an alert to a group of users; executing a recovery or clean-up script associated with the root cause; submitting a defect report to a defect-tracking system; or custom actions that could be added by system operators in the form of scripts or other commands. Thus, the system has extensibility to perform other actions in the context of an identified root cause.

Figure 12:
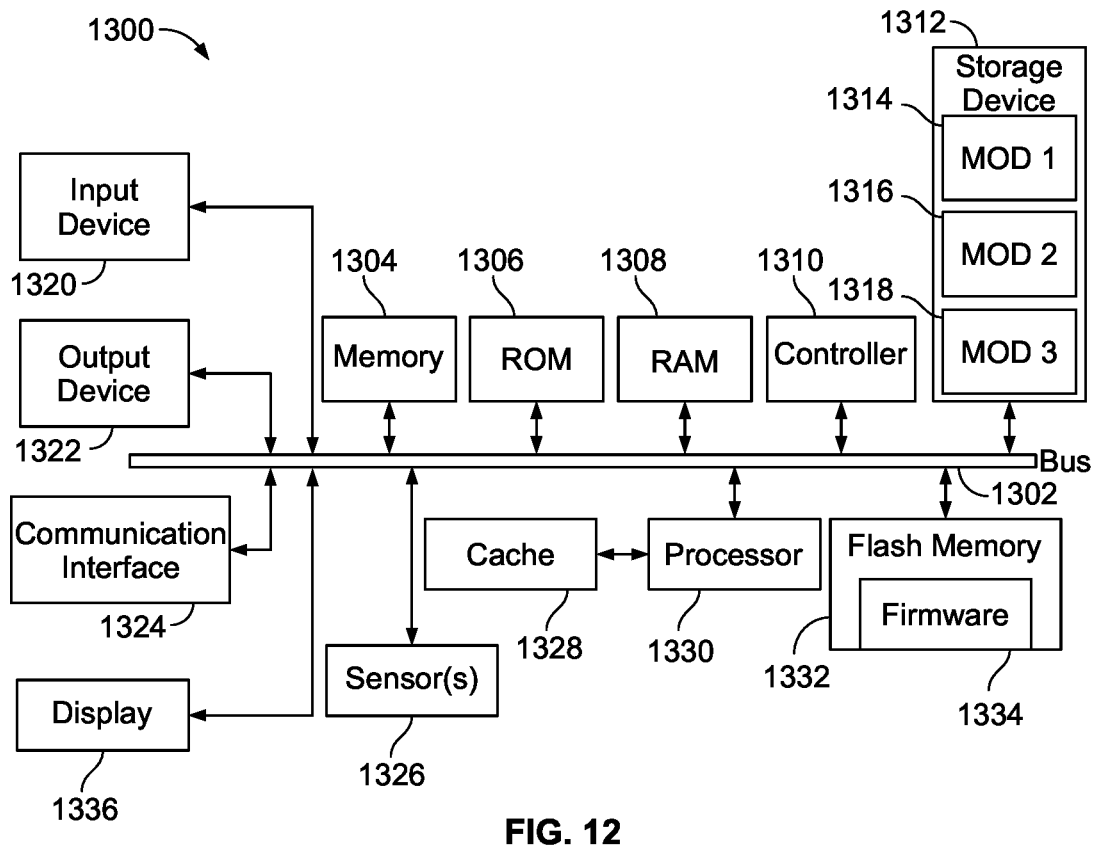
FIGS. 12 and 13 illustrate exemplary systems in accordance with various examples of the present disclosure.
Figure 13:
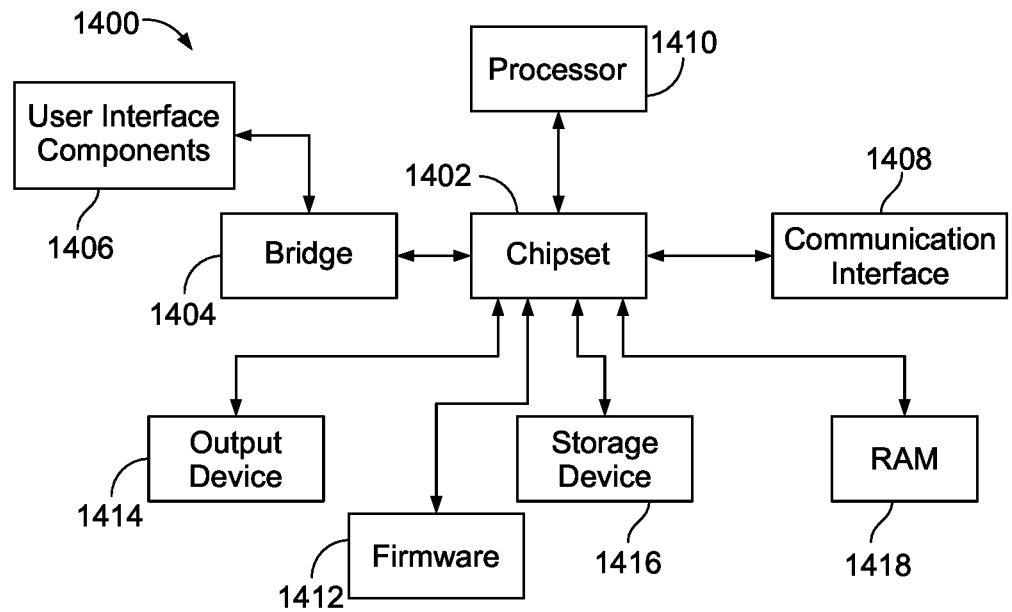

FIGS. 12-13 illustrate an example computing system 1300, in which the components of the computing system are in electrical communication with each other using a bus 1302. The system 1300 includes a processing unit (CPU or processor) 1330 and a system bus 1302 that couple various system components, including the system memory 1304 (e.g., read only memory (ROM) 1306 and random access memory (RAM) 1308), to the processor 1330. The system 1300 can include a cache of high-speed memory connected directly with, in close proximity to, or integrated as part of the processor 1330. The system 1300 can copy data from the memory 1304 and/or the storage device 1312 to the cache 1328 for quick access by the processor 1330. In this way, the cache can provide a performance boost for processor 1330 while waiting for data. These and other modules can control or be configured to control the processor 1330 to perform various actions. Other system memory 1304 may be available for use as well. The memory 1304 can include multiple different types of memory with different performance characteristics. The processor 1330 can include any general purpose processor and a hardware module or software module, such as module 1 1314, module 2 1316, and module 3 1318 embedded in storage device 1312. The hardware module or software module is configured to control the processor 1330, as well as a special-purpose processor where software instructions are incorporated into the actual processor design. The processor 1330 may essentially be a completely self-contained computing system that contains multiple cores or processors, a bus, memory controller, cache, etc. A multi-core processor may be symmetric or asymmetric.

To enable user interaction with the computing device 1300, an input device 1320 is provided as an input mechanism. The input device 1320 can comprise a microphone for speech, a touch-sensitive screen for gesture or graphical input, keyboard, mouse, motion input, and so forth. In some instances, multimodal systems can enable a user to provide multiple types of input to communicate with the system 1300. In this example, an output device 1322 is also provided. The communications interface 1324 can govern and manage the user input and system output.

Storage device 1312 can be a non-volatile memory to store data that is accessible by a computer. The storage device 1312 can be magnetic cassettes, flash memory cards, solid state memory devices, digital versatile disks, cartridges, random access memories (RAMs) 1308, read only memory (ROM) 1306, and hybrids thereof.

The controller 1310 can be a specialized microcontroller or processor on the system 1300, such as a BMC (baseboard management controller). In some cases, the controller 1310 can be part of an Intelligent Platform Management Interface (IPMI). Moreover, in some cases, the controller 1310 can be embedded on a motherboard or main circuit board of the system 1300. The controller 1310 can manage the interface between system management software and platform hardware. The controller 1310 can also communicate with various system devices and components (internal and/or external), such as controllers or peripheral components, as further described below.

The controller 1310 can generate specific responses to notifications, alerts, and/or events, and communicate with remote devices or components (e.g., electronic mail message, network message, etc.) to generate an instruction or command for automatic hardware recovery procedures, etc. An administrator can also remotely communicate with the controller 1310 to initiate or conduct specific hardware recovery procedures or operations, as further described below.

The controller 1310 can also include a system event log controller and/or storage for managing and maintaining events, alerts, and notifications received by the controller 1310. For example, the controller 1310 or a system event log controller can receive alerts or notifications from one or more devices and components, and maintain the alerts or notifications in a system event log storage component.

Flash memory 1332 can be an electronic non-volatile computer storage medium or chip that can be used by the system 1300 for storage and/or data transfer. The flash memory 1332 can be electrically erased and/or reprogrammed. Flash memory 1332 can include EPROM (erasable programmable read-only memory), EEPROM (electrically erasable programmable read-only memory), ROM, NVRAM, or CMOS (complementary metal-oxide semiconductor), for example. The flash memory 1332 can store the firmware 1334 executed by the system 1300 when the system 600 is first powered on, along with a set of configurations specified for the firmware 1334. The flash memory 1332 can also store configurations used by the firmware 1334.

The firmware 1334 can include a Basic Input/Output System or equivalents, such as an EFI (Extensible Firmware Interface) or UEFI (Unified Extensible Firmware Interface). The firmware 1334 can be loaded and executed as a sequence program each time the system 1300 is started. The firmware 1334 can recognize, initialize, and test hardware present in the system 600 based on the set of configurations. The firmware 1334 can perform a self-test, such as a POST (Power-On-Self-Test), on the system 1300. This self-test can test the functionality of various hardware components such as hard disk drives, optical reading devices, cooling devices, memory modules, expansion cards, and the like. The firmware 1334 can address and allocate an area in the memory 1304, ROM 1306, RAM 1308, and/or storage device 1312, to store an operating system (OS). The firmware 1334 can load a boot loader and/or OS, and give control of the system 1300 to the OS.

The firmware 1334 of the system 1300 can include a firmware configuration that defines how the firmware 1334 controls various hardware components in the system 1300. The firmware configuration can determine the order in which the various hardware components in the system 1300 are started. The firmware 1334 can provide an interface, such as an UEFI, that allows a variety of different parameters to be set, which can be different from parameters in a firmware default configuration. For example, a user (e.g., an administrator) can use the firmware 1334 to specify clock and bus speeds, define what peripherals are attached to the system 1300, set monitoring of health (e.g., fan speeds and CPU temperature limits), and/or provide a variety of other parameters that affect overall performance and power usage of the system 1300. While firmware 1334 is illustrated as being stored in the flash memory 1332, one of ordinary skill in the art will readily recognize that the firmware 1334 can be stored in other memory components, such as memory 1304 or ROM 1306.

System 1300 can include one or more sensors 1326. The one or more sensors 1326 can include, for example, one or more temperature sensors, thermal sensors, oxygen sensors, chemical sensors, noise sensors, heat sensors, current sensors, voltage detectors, air flow sensors, flow sensors, infrared thermometers, heat flux sensors, thermometers, pyrometers, etc. The one or more sensors 1326 can communicate with the processor, cache 1328, flash memory 1332, communications interface 1324, memory 1304, ROM 1306, RAM 1308, controller 1310, and storage device 1312, via the bus 1302, for example. The one or more sensors 1326 can also communicate with other components in the system via one or more different means, such as inter-integrated circuit (I2C), general purpose output (GPO), and the like. Different types of sensors (e.g., sensors 1326) on the system 1300 can also report to the controller 1310 on parameters, such as cooling fan speeds, power status, operating system (OS) status, hardware status, and so forth. A display 1336 may be used by the system 1300 to provide graphics related to the applications that are executed by the controller 1310.

FIG. 13 illustrates an example computer system 1400 having a chipset architecture that can be used in executing the described method(s) or operations, and generating and displaying a graphical user interface (GUI). Computer system 1400 can include computer hardware, software, and firmware that can be used to implement the disclosed technology. System 1400 can include a processor 1410, representative of a variety of physically and/or logically distinct resources capable of executing software, firmware, and hardware configured to perform identified computations. Processor 1410 can communicate with a chipset 1402 that can control input to and output from processor 1410. In this example, chipset 1402 outputs information to output device 1414, such as a display, and can read and write information to storage device 1416. The storage device 1416 can include magnetic media, and solid state media, for example. Chipset 1402 can also read data from and write data to RAM 1418. A bridge 1404 for interfacing with a variety of user interface components 1406, can be provided for interfacing with chipset 1402. User interface components 1406 can include a keyboard, a microphone, touch detection, and processing circuitry, and a pointing device, such as a mouse.

Chipset 1402 can also interface with one or more communication interfaces 1408 that can have different physical interfaces. Such communication interfaces can include interfaces for wired and wireless local area networks, for broadband wireless networks, and for personal area networks. Further, the machine can receive inputs from a user via user interface components 1406, and execute appropriate functions, such as browsing functions by interpreting these inputs using processor 1410.

Moreover, chipset 1402 can also communicate with firmware 1412, which can be executed by the computer system 1400 when powering on. The firmware 1412 can recognize, initialize, and test hardware present in the computer system 1400 based on a set of firmware configurations. The firmware 1412 can perform a self-test, such as a POST, on the system 1400. The self-test can test the functionality of the various hardware components 1402-1418. The firmware 1412 can address and allocate an area in the memory 1418 to store an OS. The firmware 1412 can load a boot loader and/or OS, and give control of the system 1400 to the OS. In some cases, the firmware 1412 can communicate with the hardware components 1402-1410 and 1414-1418. Here, the firmware 1412 can communicate with the hardware components 1402-1410 and 1414-1418 through the chipset 1402, and/or through one or more other components. In some cases, the firmware 1412 can communicate directly with the hardware components 1402-1410 and 1414-1418.

It can be appreciated that example systems 1300 (in FIGS. 12) and 1400 can have more than one processor (e.g., 1330, 1410), or be part of a group or cluster of computing devices networked together to provide greater processing capability.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware, generalized hardware made specialized by the execution of software thereon that enables the hardware to perform specific function, software stored on a computer-readable medium, or a combination thereof.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A diagnostic system for determining a root cause of a fault in a virtual remote desktop system providing access to virtual desktops by client devices, the virtual remote desktop system having a plurality of different interconnected service components, the system comprising:
   a processing unit;
   an event collection module executed by the processing unit coupled to each of the plurality of types of service components of the virtual remote desktop system including desktop client software on the client devices and virtual desktop hosts running on a regional data center, the event collection module collecting data associated with events from the service components that are traced to the fault via interconnections between the service components, wherein a type of data associated with events from a first type of service component is different from a type of data associated with events from a second type of service component, wherein the events for the first type of service component are categorized by a first set of attributes based on the data from the first type of service component and the events for the second type of service component are categorized by a second set of attributes based on the data from the second type of service component, wherein the first set of attributes is different from the second set of attributes;
   an aggregation module executed by the processing unit coupled to the event collection module, the aggregation module mapping the first set of attributes and the second set of attributes to a standardized set of attributes, merging the collected events in a time-ordered stream, providing context to the events in the time-ordered stream through relationships between the collected events determined by the standardized set of attributes, and generating a correlated event stream correlating events by those events with identical contexts;
   an analysis system executed by the processing unit identifying one of the events in the correlated event stream as the likely root cause of the fault in near real-time to execute a computer script to recover or clean-up one of the client devices or virtual desktop hosts in the virtual remote desktop system based on the identified likely root cause, wherein the identification of the likely root cause includes determining a potential root cause based on a stored rule that includes an input of at least some of the events in the event stream and an output of a candidate root cause based on at least some of the events in the event stream, the rule including logic to match a sequence pattern of events from some of the events in the event stream to the candidate root cause.

2. The system of claim 1, wherein the rule is one of a plurality of rules, each of the plurality of rules correlating at least some of the events with a candidate root cause, and wherein the diagnosis analysis system executes the plurality of rules to determine candidate root causes.

3. The system of claim 2, wherein the plurality of rules each determine a numerical confidence score of the determined candidate root cause based on the frequency of input events and a numerical weight score assigned to each of the plurality of rules, wherein the weight score is based on the quality of the rule in determining the candidate root cause.

4. The system of claim 3, wherein the analysis system creates a prioritized list of the candidate root causes based on ordering the confidence scores and weights of each of the plurality of rules.

5. The system of claim 1, further comprising a knowledge database storing known past error patterns for the components, wherein the analysis system identifies the likely root cause based on matching one of the patterns.

6. The system of claim 1, wherein the attributes include a time stamp and a unique event ID, and an event source.

7. The system of claim 1, further comprising:
a configuration repository storing attributes; and
a configuration service of the aggregation module to provide the mapping of attributes to the standardized set of attributes.

8. The system of claim 1, wherein the service components further include at least one of, endpoint client devices, networks used by endpoint client devices, cloud APIs for managing virtual desktop infrastructure, regional resources, gateway hosts, agent services, virtual application servers, virtual desktop operating systems, computing services, storage services, and network services.

9. The system of claim 1, further comprising a desktop service control plane coupled to the service components and other event sources to provision and deprovision virtual machines running on the regional data center, wherein the desktop service control plane includes a monitoring service to report faults from the components.

10. The system of claim 9, further comprising an event data repository storing the events, the event collection module being coupled to the event data repository and storing collected events to the event data repository.

11. The system of claim 9, wherein the analysis system resides in the desktop service control plane.

12. The system of claim 1, further comprising a reporting module coupled to the analysis system, the reporting module alerting an operator of the likely root cause.

13. The system of claim 12, further comprising a display, wherein the reporting module generates an interface on the display showing the likely root cause and the correlated event stream.

14. The system of claim 9, wherein the virtual remote desktop system includes a plurality of agent software monitoring events from the interconnected service components each maintaining duplex communication channels with the desktop service control plane.

15. A method for determining a root cause of a fault in a virtual remote desktop system providing virtual desktops to client devices, the virtual remote desktop system having a plurality of different interconnected service components, the method comprising:
collecting data associated with events of service components via a processing unit from all service components traced to the fault via the interconnections, the service components including the virtual remote desktop system including desktop client software on the client devices and virtual desktop hosts running on a regional data center, wherein a type of data associated with events from a first type of service component is different from a type of data associated with events from a second type of service component, wherein the events for the first type of service component are categorized by a first set of attributes based on the data from the first type of service component and the events for the second type of service component are categorized by a second set of attributes based on the data from the second type of service component, wherein the first set of attributes is different from the second set of attributes;
mapping the first set of attributes and the second set of attributes to a standardized set of attributes;
merging the collected events in a time-ordered event stream;
correlating the collected events in the time-ordered event stream to show relationships across events by contexts of the events, to create a correlated event stream correlating events by those events with identical contexts determined by the standardized set of attributes, via a processing unit;
analyzing the correlated event stream via a processing unit to determine a candidate root cause of the fault in near real-time, wherein the identification of the likely root cause includes determining a potential root cause based on a stored rule that includes an input of at least some of the events in the event stream and an output of a candidate root cause based on at least some of the events in the event stream, the rule including logic to match a sequence pattern of events from some of the events in the event stream to the candidate root cause; and
implementing a remediation of the fault in the virtual remote desktop system based on the identified likely root by executing a computer script to recover or clean-up one of the client devices or virtual desktop hosts in the virtual remote desktop system based on the identified likely root cause.

16. The method of claim 15, wherein the rule is one of a plurality of rules, each of the plurality of rules correlating at least some of the events with a candidate root cause, and wherein the method further comprises executing the plurality of rules to determine candidate root causes.

17. The method of claim 16, wherein the plurality of rules each determine a numerical confidence score of the determined candidate root cause based on the frequency of input events and a numerical weight score assigned to each of the plurality of rules, wherein the weight score is based on the quality of the rule in determining the candidate root cause.

18. The method of claim 17, further comprising creating a prioritized list of the candidate root causes based on ordering the confidence scores and weights of each of the plurality of rules.

19. The method of claim 15, further comprising storing known past error patterns for the components in a knowledge database, wherein the candidate root cause is determined based on matching one of the patterns.

20. The method of claim 15, further comprising:
categorizing the events by attributes including a time stamp and a unique event ID, and an event source; and
determining relationships between the events by the attributes.

21. The method of claim 15, further comprising:
storing the attributes in a configuration repository.

22. The method of claim 15, wherein the service components further include at least one of, endpoint client devices, networks used by endpoint client devices, cloud APIs for managing virtual desktop infrastructure, regional resources, gateway hosts, agent services, virtual application servers, virtual desktop operating systems, computing services, storage services, and network services.

23. The method of claim 15, further comprising reporting faults from the components via a monitoring service of a desktop service control plane, wherein the desktop service control plane provisions and deprovisions virtual machines running on the regional data center.

24. The method of claim 23, further comprising storing the events in an event data repository.

25. The method of claim 23, wherein the analysis system resides in the desktop service control plane.

26. The method of claim 15, further comprising alerting an operator of the candidate root cause.

27. The method of claim 26, further comprising generating an interface showing the candidate root cause and the correlated event stream.

28. The method of claim 23, wherein the virtual remote desktop system includes a plurality of agent software monitoring events from the interconnected service components each maintaining duplex communication channels with the desktop service control plane.

* * * * *